(12) United States Patent
Raj

(10) Patent No.: US 9,563,950 B2
(45) Date of Patent: Feb. 7, 2017

(54) METHODS AND TOOLS FOR ANALYZING BRAIN IMAGES

(71) Applicant: Cornell University, Ithaca, NY (US)

(72) Inventor: Ashish Raj, New York, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/777,950

(22) PCT Filed: Mar. 20, 2014

(86) PCT No.: PCT/US2014/031352
§ 371 (c)(1),
(2) Date: Sep. 17, 2015

(87) PCT Pub. No.: WO2014/153466
PCT Pub. Date: Sep. 25, 2014

(65) Prior Publication Data
US 2016/0300352 A1    Oct. 13, 2016

Related U.S. Application Data

(60) Provisional application No. 61/803,762, filed on Mar. 20, 2013.

(51) Int. Cl.
G06K 9/00 (2006.01)
G06T 7/00 (2006.01)
G06K 9/62 (2006.01)

(52) U.S. Cl.
CPC ........... *G06T 7/0016* (2013.01); *G06K 9/6247* (2013.01); *G06K 9/6277* (2013.01);
(Continued)

(58) Field of Classification Search
CPC .... G06K 9/469; G06K 9/6247; G06K 9/6277; G06T 2207/10081; G06T 2207/10088; G06T 2207/10092; G06T 2207/10104; G06T 2207/20081; G06T 2207/30016; G06T 7/0012; A61B 5/055; A61N 2/006; A61N 2/02
See application file for complete search history.

(56) References Cited

U.S. PATENT DOCUMENTS

2006/0104494 A1   5/2006  Collins et al.
2010/0303318 A1   12/2010 Benali et al.
(Continued)

OTHER PUBLICATIONS

Ivkovic et al, "Global estimation of anatomical connection strength in diffusion MRI tractorgraphy by message-passing", 2011 IEEE International Symposium on Information Theory Proceeedings. pp. 2721-2725, DOI: 10.1109/ISIT.2011.6034067.*

(Continued)

*Primary Examiner* — Tom Y Lu
(74) *Attorney, Agent, or Firm* — Foley & Lardner LLP

(57) ABSTRACT

Methods and systems for analyzing a medical image of a subject's brain are disclosed. Analysis of a medical image of a subject's brain for predictive and diagnostic determination of neurodegenerative disease state. The method comprises parcellating the grey matter in the image of the brain and determining the size of each region to generate an initial pattern of the disease process; applying a diffusion kernel to obtain an output vector; and predicting future changes to the brain based on the output vector. Another method of analyzing a medical image of a subject's brain includes solving for eigen-modes of a connectivity matrix, projecting the eigen-modes onto the initial disease state to produce an output product and diagnosing a disease or lack thereof based on a comparison of the output product to one or more reference standards.

11 Claims, 28 Drawing Sheets

(52) U.S. Cl.
CPC ............... *G06T 2207/10081* (2013.01); *G06T 2207/10088* (2013.01); *G06T 2207/10104* (2013.01); *G06T 2207/20076* (2013.01); *G06T 2207/20081* (2013.01); *G06T 2207/30016* (2013.01)

(56) References Cited

U.S. PATENT DOCUMENTS

| | | | |
|---|---|---|---|
| 2011/0301431 A1* | 12/2011 | Greicius | G01R 33/4806 600/300 |
| 2013/0071330 A1* | 3/2013 | Catalano | G01N 33/5035 424/9.2 |
| 2013/0129168 A1* | 5/2013 | Ross | G06T 7/0012 382/128 |

OTHER PUBLICATIONS

Zhou et al, "Predicting Regional Neurodegeneration from the Healthy Brain Functional Connectome" Neuron, vol. 73, Issue 6, Mar. 22, 2012, pp. 1216-1227.*

International Search Report and Written Opinion for International Patent Application No. PCT/US2014/031352 mailed Nov. 10, 2014, 11 pages.

Raj, Ashish et al., "A Network Diffusion Model of Disease Progression in Dementia," Neuron, (2012), vol. 73, pp. 1204-1215.

Zalesky, Andrew et al., "Whole-brain anatomical networks: Does the choice of nodes matter?," NeuroImage, (2010), vol. 50, pp. 970-983.

* cited by examiner

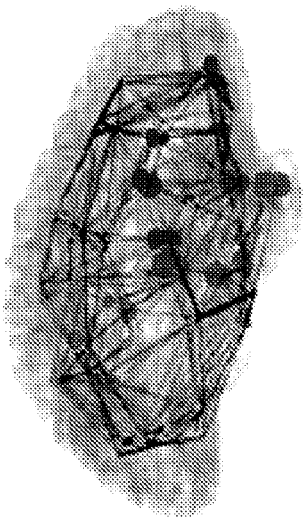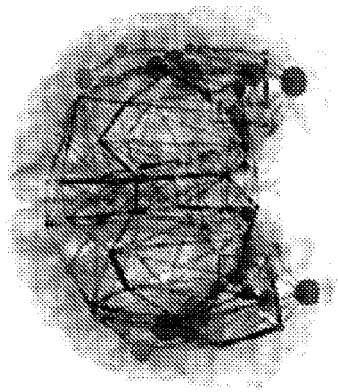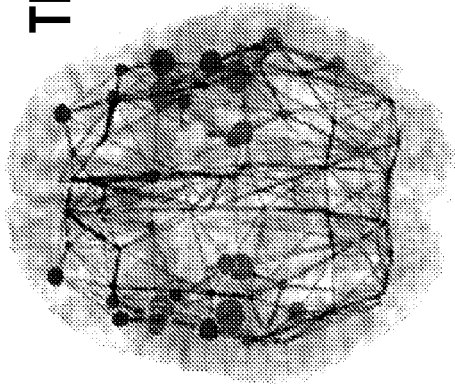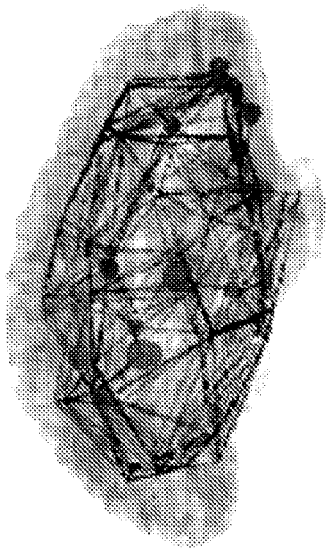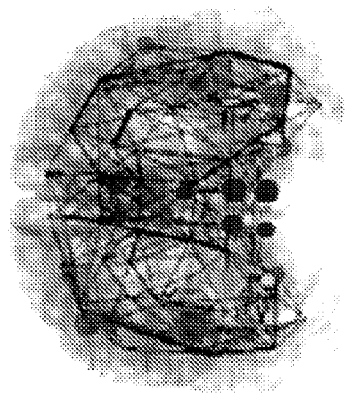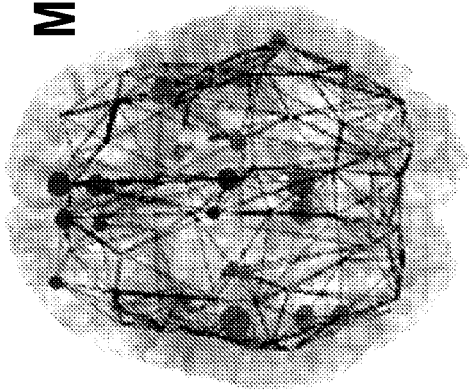
Fig. 6

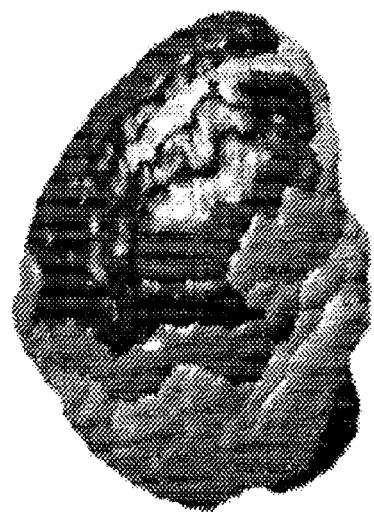
Fig. 8

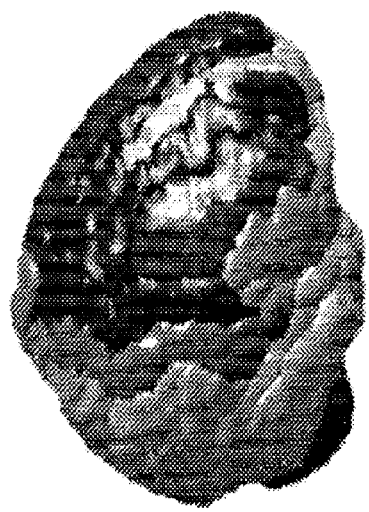
Fig. 9

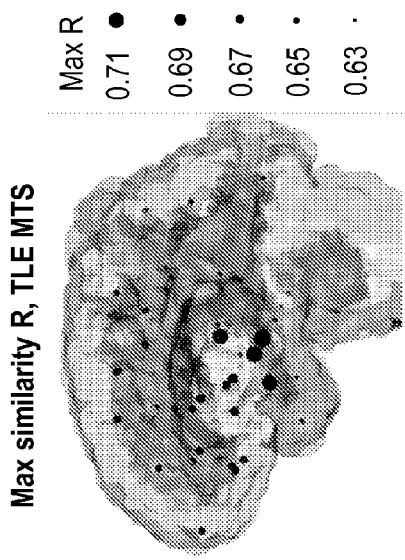
Fig. 19A Positive t-stats for TLE MTS
t-stats: 8.90, 6.83, 4.77, 2.70, 0.63
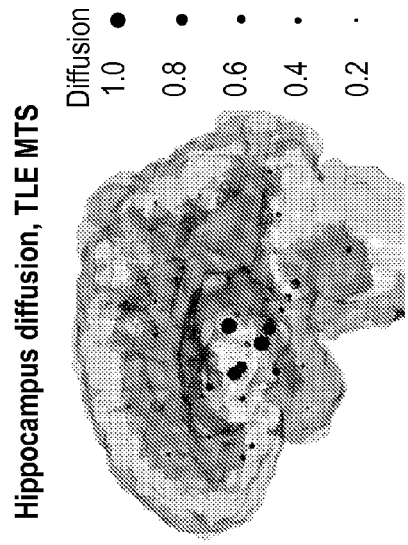
Fig. 19B Max similarity R, TLE MTS
Max R: 0.71, 0.69, 0.67, 0.65, 0.63
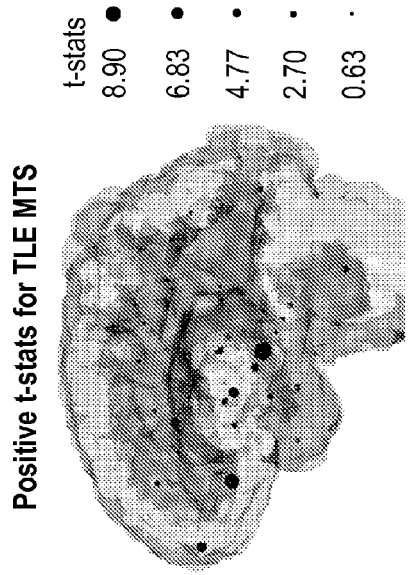
Fig. 19C Hippocampus similarity curve, TLE MTS
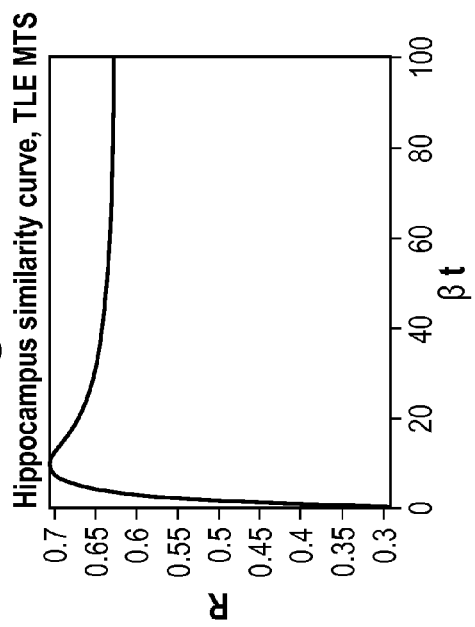
Fig. 19D Hippocampus diffusion, TLE MTS
Diffusion: 1.0, 0.8, 0.6, 0.4, 0.2

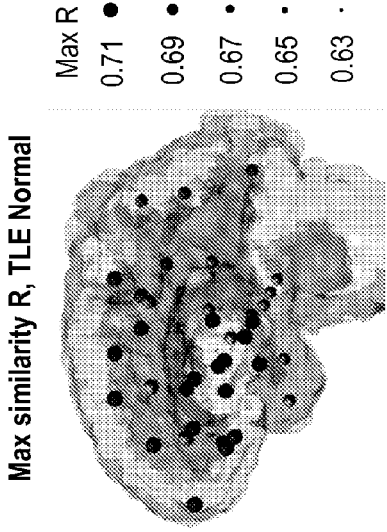
Fig. 20A Positive t-stats for TLE Normal
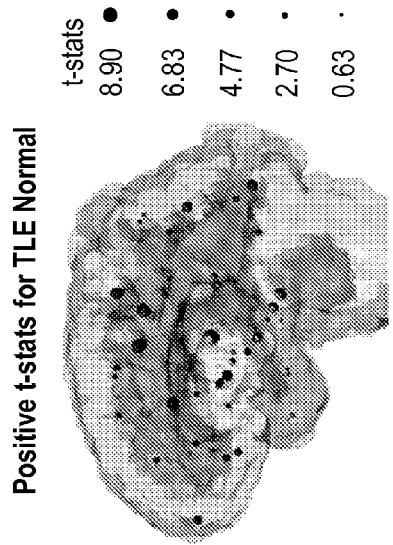
Fig. 20B Max similarity R, TLE Normal
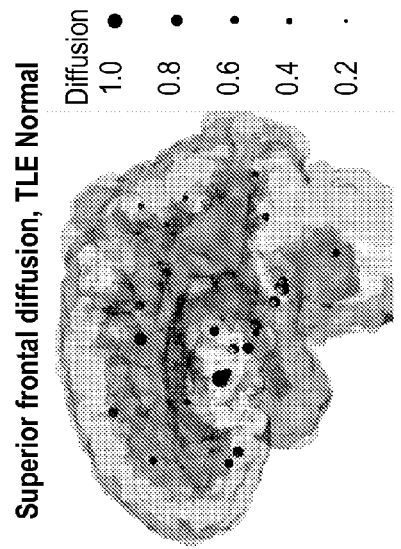
Fig. 20C Superior frontal similarity curve, TLE Normal
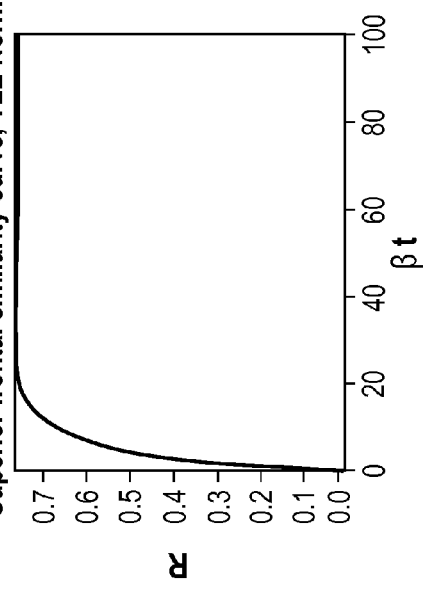
Fig. 20D Superior frontal diffusion, TLE Normal

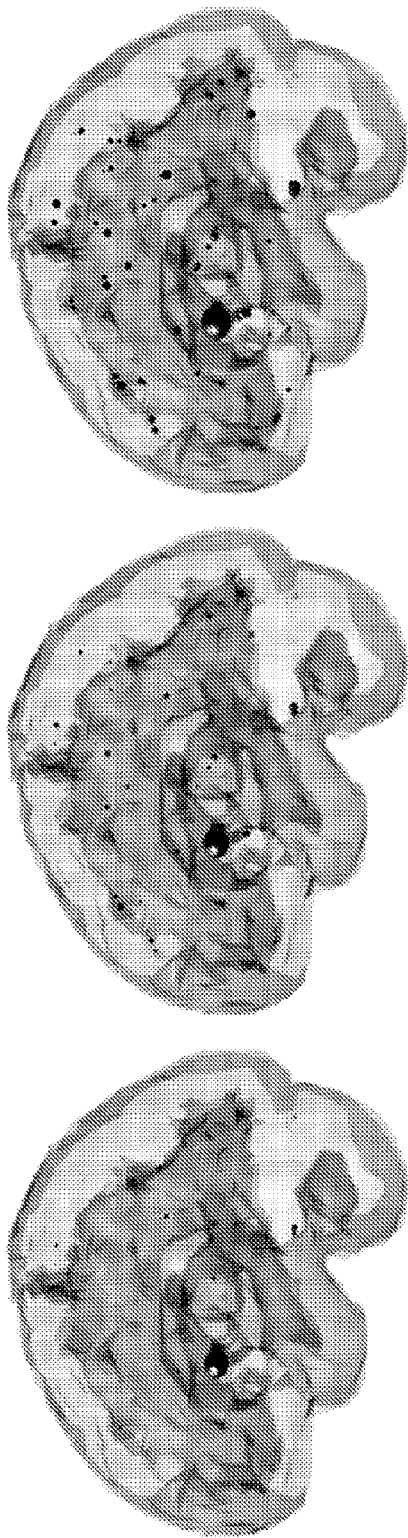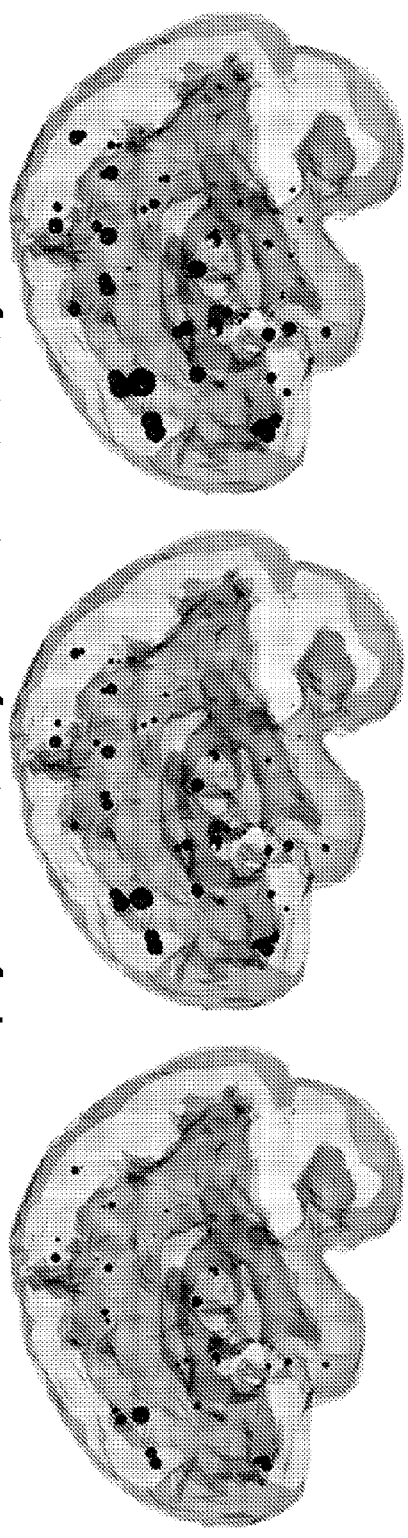
Fig. 25

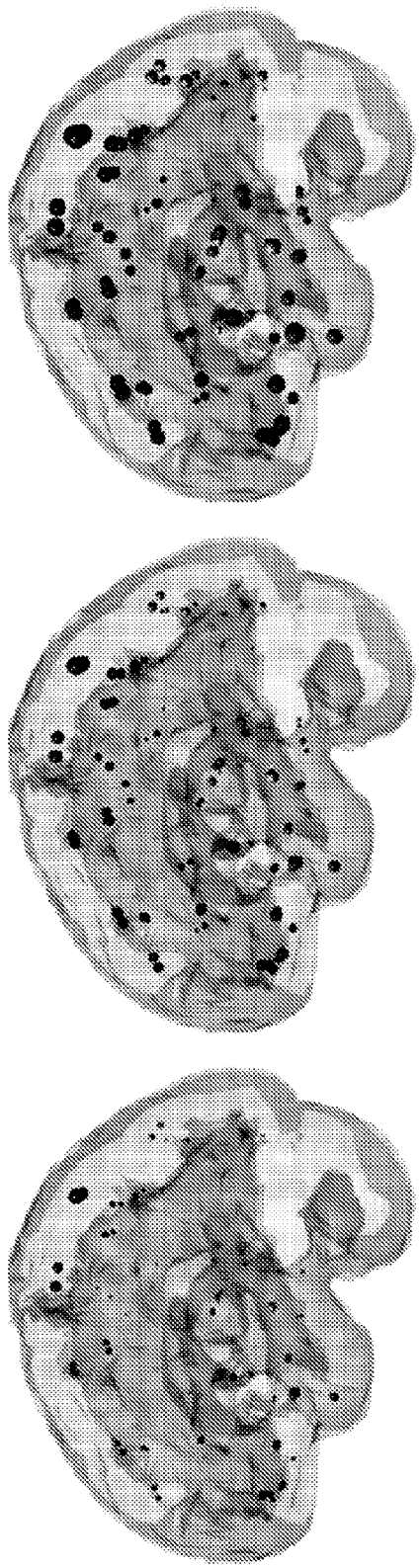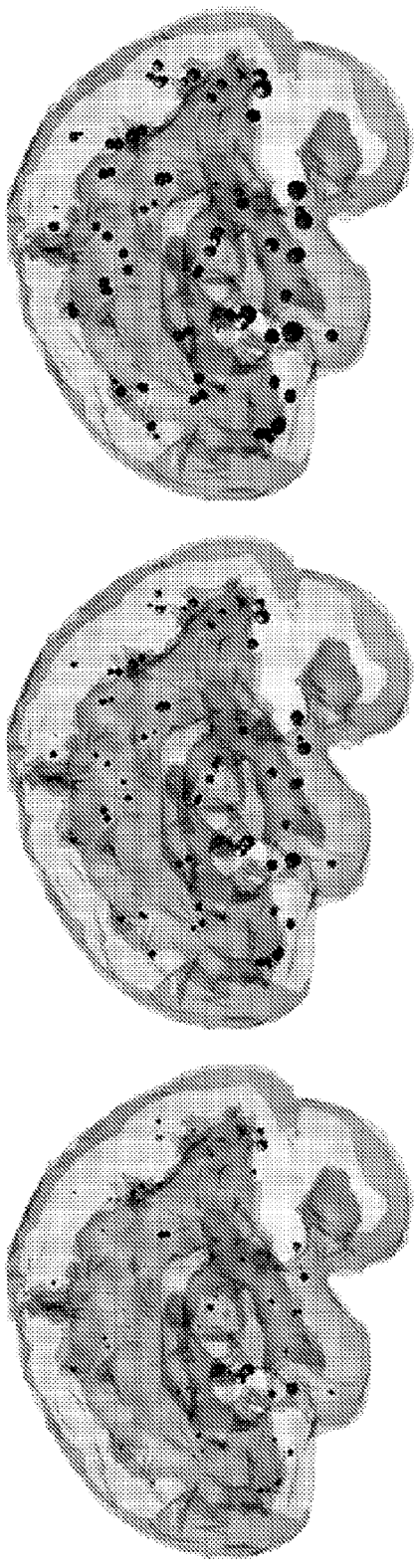
Fig. 26

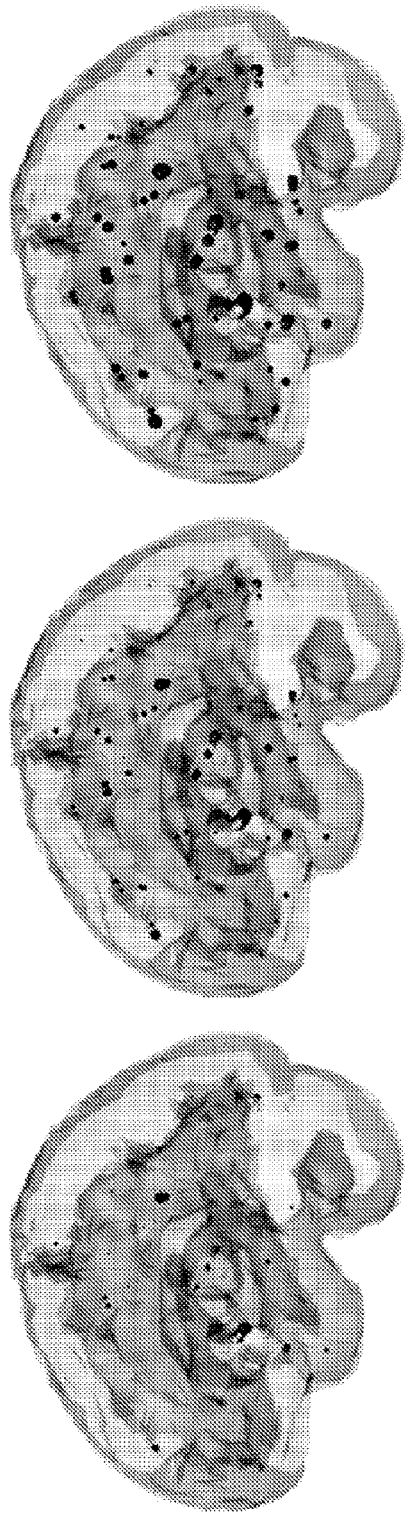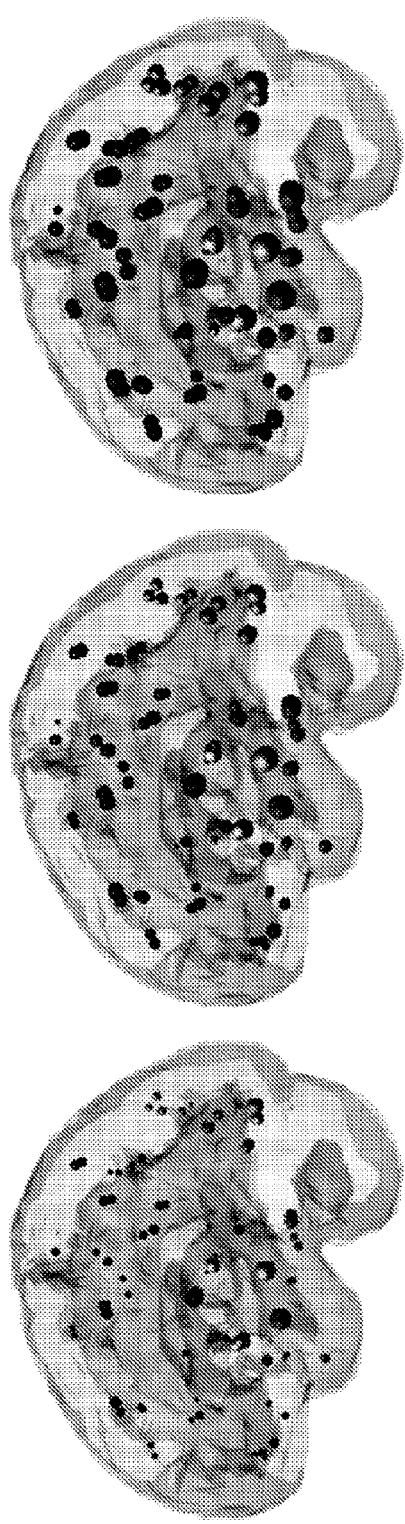
Fig. 27

METHODS AND TOOLS FOR ANALYZING BRAIN IMAGES

CROSS-REFERENCE TO RELATED APPLICATIONS

The present application is a National Stage Application under 35 U.S.C. 371 of International Application No. PCT/US2014/031352, filed Mar. 20, 2014, which claims the benefit of U.S. Provisional Patent Application No. 61/803,762, filed Mar. 20, 2013, the entire contents of which are incorporated herein by reference.

GOVERNMENT FUNDING

This invention was made with Government support under Grant Number R01NS075425 awarded by the National Institute of Neurological Disorders and Stroke. The United States Government may have certain rights in the invention.

BACKGROUND

Dementia is estimated to affect 25 million people worldwide, of which 30-70% are Alzheimer's disease (AD) and 10% frontotemporal dementia (FTD). Neuropathological evidence points to a neuronal/synaptic polioencephalopathy with the disease beginning in the grey matter with accumulation of misfolded beta amyloid and/or tau protein, and progressing along extant fiber pathways via secondary Wallerian degeneration, disconnection, loss of signaling, axonal reaction and post-synaptic dendrite retraction. Atrophy patterns captured from longitudinal MRI via segmentation, atlas-based parcellation, and volumetric analysis indicate that progression follows vulnerable fiber pathways rather than proximity. This view is supported by recent studies showing alterations in brain networks due to neurodegeneration. Amyloid deposition, metabolism and atrophy in AD show spatially distinct involvement of the posterior temporal heteromodal network, while the frontal (behavioral) variant of FTD, bvFTD, appears restricted to the orbitofrontal network. These findings led to the network-degeneration view that various dementias selectively target distinct intrinsic brain networks.

This view is strongly supported by neuropathological evidence that numerous disease proteins, including alpha-synuclein, beta-amyloid, and TDP-43, have the capacity to misfold and march throughout local and then long-range circuits via transsynaptic spread. Misfolded proteins can trigger misfolding of adjacent same-species proteins, which in turn cascade along neuronal pathways. Pathological tau conformers can induce non-folded tau to adopt pathological conformations. Tau misfolding could propagate from the exterior to interior of a cell. These findings suggest a "prion-like" mechanism of transmission underlying all dementias.

SUMMARY

Both network degeneration view and supporting pathological data are descriptive rather than explicative, qualitative rather than model-based. Various mechanisms of transmission can be mathematically modeled by a diffusive mechanism, mediated by the brain's connectivity network obtained from tractography of healthy brain MRI. Subsequent graph theoretic analysis provides a fully quantitative, testable, predictive model of dementia. Specifically, spatially distinct "persistent modes" can be predicted, which were found to recapitulate known patterns of dementia and recent findings of selectively vulnerable dissociated brain networks. Model predictions also closely match T1-weighted MRI volumetrics of 18 Alzheimer's and 18 fronto-temporal dementia subjects. Prevalence rates predicted by the model strongly agree with published data.

This network diffusion model is therefore a new computational tool which has many important commercial and scientific implications. These include: dimensionality reduction, differential diagnosis and most importantly, prediction of future atrophy using baseline morphometrics derived from a medical image of a subject's brain. This last application: the operationalization of the model into a self-contained computational tool which can take a baseline scan of a patient, extract needed information from it automatically, apply the network diffusion model to this information, and thereby predict the future states of neurodegeneration and its spatial patterns in the person's brain.

In an example embodiment, an electronic computing device-implemented method for analyzing a medical image of a subject's brain is provided in which an image of the subject's brain is parcellated by a computing device, to obtain an initial disease state. A diffusion kernel is then applied to the subject's initial disease state by the computing device to obtain an output vector. The diffusion kernel may be obtained from the subject's connectivity matrix. Based on the output vector, future changes to the subject's brain are predicted.

In another example embodiment, an electronic computing device-implemented method for analyzing a medical image of a subject's brain is provided in which an image of the subject's brain is parcellated by a computing device, to obtain an initial disease state. Eigen-modes of a connectivity matrix, associated with a network diffusion model, the subject or another subject, are solved for, by a computing device. The eigen-modes are projected onto the initial disease state to produce an output product and a disease, or lack thereof is diagnosed based on the comparison of the output product to reference standards.

According to one aspect, a non-transitory computer-readable medium is coupled to one or more processors. The non-transitory computer-readable medium holds instructions that cause the one or more processors to parcellate the grey matter in a medical image of a subject's brain to obtain an initial disease state, apply a diffusion kernel to the medical image to obtain an output vector and based on the output vector, future changes to the subject's brain are predicted.

According to one aspect, a non-transitory computer-readable medium is coupled to one or more processors. The non-transitory computer-readable medium holds instructions that cause the one or more processors to parcellate the grey matter in a medical image of a subject's brain to obtain an initial disease state, solve for eigen-modes of a connectivity matrix, project the eigen-modes onto the initial disease state to produce an output product and diagnose a disease or lack thereof in the subject based on the comparison of the output product to reference standards.

According to another aspect, a system for analyzing a subject's brain, comprising a memory coupled to one or more processors. The one or more processors are configured to parcellate the grey matter in a medical image of a subject's brain to obtain an initial disease state, apply a diffusion kernel to the medical image to obtain an output vector and based on the output vector, future changes to the subject's brain are predicted.

According to another aspect, a system for analyzing a subject's brain, comprising a memory coupled to one or more processors. The one or more processors are configured to parcellate the grey matter in a medical image of a subject's brain to obtain an initial disease state, solve for eigen-modes of a connectivity matrix, project the eigen-modes onto the initial disease state to produce an output product and diagnose a disease or lack thereof in the subject based on the comparison of the output product to reference standards.

BRIEF DESCRIPTION OF THE DRAWINGS

FIG. 6 depicts visual correspondence between an eigen-mode of a healthy brain and a measured neurodegeneration pattern of Alzheimer's disease in accordance with an illustrative embodiment.

FIG. 8 depicts T-scores of cortical atrophy of AD and bvFTD, and the $2^{nd}$ and $3^{rd}$ eigen-modes, mapped onto the cortical surface using the 90-region AAL cerebral atlas in accordance with an illustrative embodiment.

FIG. 9 depicts cortical atrophy and eigen-modes mapped onto the cortical surface using a different, 86-region Free-Surfer atlas in accordance with an illustrative embodiments.

FIG. 19 depicts correlation of predicted and measured atrophy patterns in epileptic subjects with visible atrophy patterns.

FIG. 20 depicts correlation of predicted and measured atrophy patterns in epileptic subjects with no visible atrophy patterns.

FIG. 25 depicts "glass brain" illustrations of two example MCI non-converters from the ADNI cohort.

FIG. 26 depicts "glass brain" illustrations of two example MCI non-converters, one of which (bottom row) exhibits the classic AD pattern of progression within and outwards from the temporal lobe.

FIG. 27 depicts "glass brain" illustrations of two example AD patterns.

DETAILED DESCRIPTION

Figure 1:
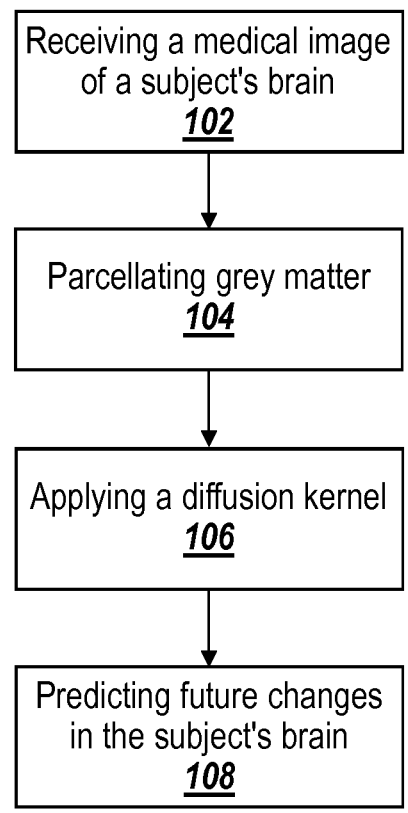
FIG. 1 depicts a flow chart of a method for analyzing a subject's brain in accordance with an illustrative embodiment.

Following below are more detailed descriptions of various concepts related to, and implementations of, methods, apparatuses, and systems for analyzing the brain of a subject. The various concepts introduced above and discussed in greater detail below may be implemented in any of numerous ways, as the described concepts are not limited to any particular manner of implementation. Specific implementations and applications are provided primarily for illustrative purposes.

In the following description, reference is made to the accompanying drawings that form a part hereof, and in which is shown by way of illustration specific embodiments which may be practiced. These embodiments are described in detail to enable those skilled in the art to practice the invention, and it is to be understood that other embodiments may be utilized and that logical changes may be made without departing from the scope of the present invention. The following description of example embodiments is, therefore, not to be taken in a limited sense, and the scope of the present invention is defined by the appended claims.

Prediction and diagnostic analysis of the brain presents two major challenges. First, a biophysical model that captures the microscopic properties of prion-like disease progression must be employed. Second, the macroscopic consequences of such a disease progression must be identified. To overcome the first challenge, a model assuming a diffusive mechanism is applied. A classic model of random dispersion is used that is driven by concentration gradients with wide physiological applicability, for instance, in modeling neuronal apoptosis dynamics via diffusible death factors and neuronal transport and trans-synaptic movement of neurotransmitters. Diffusive spread is an excellent model for any disease-causing agent (e.g. tau, amyloid or synuclein) whose inter-neuronal advance fulfills the criterion that the rate of propagation is proportional to concentration level differentials. The behavior of this diffusive prion-like propagation on whole brain structural connectivity networks is obtained from whole brain tractography of diffusion MRI scans. The nodes of this network correspond to gray matter structures of a labeled brain atlas, and its edges denote the strength of fiber tract connectivity.

The macroscopic consequences of prion-like diffusive progression are restricted to this diffusive progression to follow the fiber pathways defined by the brain connectivity network, and the resulting macroscopic dynamics of this progression are mathematically derived. The model of diffusive prion-like propagation on the whole brain healthy network (henceforth called the "network diffusion model") is consistent with and predictive of the large-scale patterns of disease seen in various dementias.

The network diffusion model includes a diffusion kernel and eigen-modes and is based on the current opinion of gray-matter (GM)-mediated neurodegeneration whereby prion-like protein misfolding propagates within neurons as well as trans-synaptically, retrograde axonal transport deficits cut off growth factor supply to projection neurons, begetting axonal degeneration, synapse loss, and post-synaptic dendrite retraction. There is mounting neuropathological evidence that numerous disease proteins, including tau, alpha-synuclein, beta-amyloid, and TDP-43, have the capacity to misfold and march through neural circuits via trans-synaptic spread. A 2-stage model has been proposed that is common to all degenerative etiologies consisting of a concentration-dependent formation of pathogenic oligomer followed by an independent process that causes aggregation onto this oligomeric template.

If a common concentration-dependent diffusive prion-like process can reproduce subsequent atrophy patterns, this raises a somewhat unorthodox possibility that diverse degenerative etiologies have common macroscopic consequences. Indeed, the proposed model does not differentiate between individual proteopathic carriers, bunching them together into a generalized "disease factor." This is justified on two grounds. First, there is a considerable diversity of published opinion on the etiology of neurodegeneration and the effect of individual misfolding proteins. Second, the specific biochemical properties of the prion-like agent may be inconsequential for the macroscopic and chronic manifestation of disease, as evidenced from recent joint histopathological/morphometric studies. There is the idea that proteopathic carriers with varied etiology can have a shared progression mechanism via "permissible templating." The spatial distribution of beta amyloid pathology in AD is poorly correlated with whole brain atrophy patterns, while tau is well-correlated. However, neither tau not beta amyloid are specific to AD and are found in semantic dementia, FTLD subtype, dementia with Lewy bodies and posterior cortical atrophy, etc. PIB-positive binding to A-beta and plaques were observed in 25%-45% of cognitively normal older subjects in post-mortem autopsy studies. BvFTD accommodates an even more bewildering array of pathological correlates, including alpha-synuclein, tau, ubiquitin, TDP-43 and Lewy bodies. Some have found that clinical variants of bvFTD, but not histologic variants, correlated with regional atrophy, and no volumetric difference between tau versus ubiquitin bvFTD pathology regardless of clinical subtype. No group-wise differences were found in the atrophy patterns of tau-positive versus TDP-43-positive FTLD cases. These results indicate that clinical presentations of dementias are only dependent on the brain regions they affect, rather than their histopathological correlates.

These findings provide strong support for the embodiments described below which infer macroscopic consequences of proteopathic progression without being encumbered by their specifics. The network diffusion model turns qualitative understanding of proteopathic transmission into a quantitative, fully testable model, and for the first time, provides a plausible alternative explanation for the apparent selective vulnerability of brain regions in various dementias and other neurodegenerative diseases.

The network diffusion model may be generated through any medical images of the brain that conveys connectivity information. This medical image may be obtained from healthy subjects or from the individual patient. The same network diffusion model may be used to generate diffusion kernels across many subjects and it need not be generated for analysis of brain images of each subject. Thus, the network diffusion model is generated prior to analysis of brain images of any given subject by the use of medical imaging data obtained from either the same subject or from a different set of healthy subjects. A network diffusion model may, therefore, be generically used for the analysis of brain images of many subjects.

For example, a network diffusion model may be generated using structural healthy brain networks obtained from diffusion MRI scans of young healthy volunteers, followed by whole brain tractography. The nodes of this network correspond to cortical and sub-cortical gray matter regions obtained from a labeled T1-weighted brain atlas, and the edges of this network are proportional to the number and strength of the fiber tracts that connect the nodes. A proposed network diffusion model is derived from this healthy network. The methodology of this derivation is discussed in more detail below.

A connectivity matrix is specifically generated for each subject based on a medical image of the subject's brain that carries connectivity information about that brain. Such a medical image may be generated from one of several available imaging modalities, including diffusion-weighted MRI, positron emission tomography (PET), functional MRI, resting-state functional MRI, magnetoencephalography (MEG), electroencephalography (EEG) or any other imaging modality that facilitates a measurement of the anatomic or functional connectivity between brain regions. Generation of a subject's connectivity matrix includes reconstructing a diffusion-weighted tomographic image of the subject's brain into a set of orientation distribution functions (ODFs) defined on voxels of the image. These ODFs are subsequently applied to a tractography algorithm to obtain a set of white matter tracts between brain regions, and the connectivity network between these regions may be computed. An equivalent connectivity matrix may also be obtained by computing the statistical correlation in neural activity between any two brain regions, from time-resolved signals obtained from functional MRI, MEG or EEG. In all cases, the computed connectivity network is the subject's connectivity matrix. In addition, a Laplacian matrix may be computed from the subject's connectivity matrix by performing a transform on the connectivity matrix.

Based on the network diffusion model and the subject's connectivity matrix, a diffusion kernel may be generated. The term "diffusion kernel" is used here as a convenient nomenclature easily understood by a person skilled in the art, however, this nomenclature does not imply that only a strict diffusion or diffusion-like process is captured by this invention. Indeed, a diffusion kernel may be generated that corresponds to a variety of vector-valued linear or non-linear differential equations of any degree or order. A diffusion kernel is an operator defined on the connectivity matrix. The diffusion kernel can be any operator derived directly or indirectly from the connectivity matrix that has a correspondence to a linear or non-linear differential equation of any order or degree defined on this connectivity matrix. In some embodiments, the diffusion kernel is a function of the network's connectivity matrix or its Laplacian matrix, and it can be a function of time as well. For example, in equation (3) discussed below according to one embodiment, $e^{-\beta Ht}$ is the diffusion kernel. Details regarding the generation of a diffusion kernel are discussed below.

The network diffusion model leads to the so-called network heat equation, whose solution is given by a set of distinct, exponentially decaying spatial patterns derived from the classic eigen-value decomposition operation performed on a connectivity matrix or a Laplacian related to the healthy or diseased brain network. These distinctive spatial patterns are the eigen-modes of network diffusion. These eigen-modes bear a strong resemblance to known patterns of various dementias from several published brain MRI volumetric studies. The resemblance is statistically validated by correlation analysis against measured brain atrophy of normally aged and demented subjects. In an embodiment, there is a one-to-one correspondence between the healthy network's eigen-modes and atrophy patterns of normal aging, AD and bvFTD, and other neurodegenerative diseases, including Parkinson's Disease and epilepsy. These eigen-modes also recapitulate dissociated brain networks' selectively targeted by different dementias. This provides a systemic explanation for the network degeneration theory as a simple consequence of network dynamics. The network diffusion model accurately infers the population-wide prevalence rates of various dementias, and can explain why bvFTD has higher prevalence than AD in early stages, and why it subsequently becomes much less prevalent than AD.

Qualitative neuropathological observations are successfully converted into a fully testable quantitative model that recapitulates well-known but hitherto unexplained segregated domains of various dementias. There is no need to invoke region-specific neuropathy, e.g. mesial temporal origin, or selective vulnerability within dissociated functional networks. The role of persistent modes (also referred to as eigen-modes) as biomarkers and as highly effective basis functions for dimensionality reduction, classification and automated differential diagnosis. This is especially advantageous for heterogeneous and mixed dementia, which are poorly served by classically described clinical phenotypes.

The equations that describe the dynamics of the diffusion of prion-like proteinopathies into the brain's network are solved and based on this a practical fitting algorithm is disclosed which can be used on routine clinical baseline medical imaging data of subjects, and reliably predict future atrophy patterns. The predictions match well with observed longitudinal patterns of atrophy in AD, MCI and PD subjects.

The network diffusion model, as used herein, can accurately infer the population-wide prevalence rates of various dementias, and can explain why bvFTD has higher prevalence than AD in early stages, and why it subsequently becomes much less prevalent than AD. No other disclosed model can accurately match this strong age-dependence observed in prevalence studies in dementia.

FIG. 1 depicts a method for analyzing the brain of a subject in accordance with an illustrative embodiment. A medical image is provided (operation 102). A medical image may be tomographic. The medical image may be diffusion weighted. A diffusion weighted image may be any image from which a measurement of diffusion within any given imaging voxel can be calculated or observed. A voxel, as used here, refers to a fundamental unit of an image representing a 3-dimensional space. The size of voxels in any given image may vary depending on the imaging modality used to acquire the image. The medical image may be acquired by any of a number of different imaging modalities. In terms of the use of dependent neuroanatomic tools, there are many alternatives. The medical image of the subject's brain may be acquired by any of one several available MRI modalities: T1-weighted, T2-weighted, diffusion weighted, perfusion MRI, etc. Non-MRI imaging can also be used, e.g. FGD-PET and PiB-PET, X-Ray CT, Ultrasound Imaging, optical imaging, fluorescence imaging and other modalities. Any imaging modality which shows a spatial distribution of disease patterns can be used to acquire the medical image. The medical image may be of the entire brain, with no missing regions. The medical image may also be a partial image of the brain.

The medical image may be received via an imaging device, such as an MRI, CT, Ultrasound, Optical imaging, PET, fluorescence imaging apparatus or any other imaging apparatus. The medical image may also be received via a computing device. Receiving the medical image may include retrieving the medical image from a memory coupled to a computing device or retrieving the medical image directly from the imaging apparatus.

In some implementations, parcellating grey matter of the medical image (operation 104) may be accomplished through use of one of a number of available and disclosed brain atlases. A variety of brain atlases or non-atlas based parcellation methods may be used. In some examples disclosed herein, an 86-region atlas may be used. In other examples, a 90-region atlas may be used. The foregoing examples of atlases herein do not preclude the use of other atlases with other numbers of regions or with alternatively defined regions. The parcellated medical image results in a vector that represents an initial disease state. In the case of healthy subjects, this initial disease state may be a lack of neurodegeneration.

Any of the available morphometric analysis tools can be applied, for instance FREESURFER (generated at Martinos Center for Biomedical Imaging in Charlestown, Mass.), SPM, FSL, CIVET, and others. The only requirement is that this tool should output a value for each region in the brain as a table, which we will call the initial disease state. In alternative embodiments as discussed herein, the initial disease state may also be referred to as a disease pattern, atrophy, or atrophy pattern. The method of parcellating the grey matter of the brain into these regions is also variable; any parcellated and labeled atlas could be used, for instance MNI atlas, FREESURFER atlas or the AAL atlas, among others. There can be any number of regions in the parcellation; however, more is usually better. For example in one embodiment, at least 50 regions are in the parcellation. Tractography on diffusion MRI of healthy subjects (for generating initial models) or of one or more subjects, can be performed using any one of currently freely available tools, like TrackVis, Tracula, DTI Studio, ProbtracX in FSL, among others.

For example, to create the initial disease state, grey matter brain regions were parcellated from all subjects' T1-MRI scans using an atlas-based parcellation scheme, IBASPM) to extract 116 regions of interest (ROIs), collected in the vector $v=\{v\_i \mid i \in [1,N]\}$. The mean and standard deviation of the ROI volumes were determined for each disease group. The resulting initial disease state in this example is vector v.

A connectivity matrix may be generated from the subject's separate medical image that conveys connectivity information, for instance diffusion-weighted MRI, functional MRI, MEG, EEG or perfusion MRI. The connectivity matrix may also be obtained from a different set of healthy subjects. For example, whole brain networks were extracted from HARDI scans of young healthy subjects only, using methodology previously described. Briefly, Q-ball reconstruction and tractography are performed on co-registered MRI/HARDI volumes. Parcellated ROIs are used as seed points for tractography and connection strength $c_{i,j}$ of each ROI pair i,j is estimated by weighted sum of all tracts terminating in the two regions. Cerebellar structures are removed, giving a symmetric 90×90 connectivity matrix for each young healthy subject.

A diffusion kernel is applied to the medical image (operation 106) wherein the diffusion kernel corresponds to the network diffusion model of the brain. A variety of disclosed diffusion kernels may be used in the present method. The term "diffusion kernel" is used here as a convenient nomenclature easily understood by a person skilled in the art, however, this nomenclature does not imply that only a strictly diffusion or diffusion-like process is captured by this invention. Indeed, a diffusion kernel may be generated that corresponds to a variety of vector-valued linear or non-linear differential equations of any degree or order. The diffusion kernel may be applied to a subject's brain disease patterns, as long as said disease pattern is represented by a vector and the diffusion kernel or equivalent kernel represents a linear or non-linear matrix operator derived directly or indirectly from the connectivity matrix. Applying a diffusion kernel (operation 106) may include reconstructing a diffusion-weighted tomographic image of the subject's brain into a set of orientation distribution functions (ODFs) defined on voxels of the image. These ODFs are subsequently applied to a tractography algorithm to obtain a set of white matter tracts between brain regions, and the connectivity network between these regions may be computed. This is the connectivity matrix. From this connectivity matrix, a diffusion kernel may be obtained, which is an operator defined on the network's connectivity matrix. The diffusion kernel can be any operator that has a correspondence to a linear or non-linear differential equation of any order or degree defined on this connectivity matrix. In some embodiments, the diffusion kernel is a function of the network's connectivity matrix or its Laplacian matrix, and it can be a function of time as well. The Laplacian matrix of the connectivity matrix may be obtained through a transformation of the connectivity matrix. In an embodiment, the application of the diffusion kernel (operation 106) includes a matrix-vector multiplication with the initial disease state measured by a medical image, if the diffusion kernel is linear, or to a non-linear operator applied to the initial disease state, if the diffusion kernel is non-linear. Seed points for the application of the diffusion kernel may be determined by the initial disease state. The input vector for the operation defined by the diffusion kernel is the initial disease state. The resulting output vector from the application of the diffusion kernel encapsulates future predictions regarding the subject's future disease states and their topographic distribution on the brain. The output vector indicates the spread of disease through the brain via the modeled white matter tracts that are represented in the connectivity matrix. Future changes to the brain are thus predicted (operation 108) by correlating the output vector obtained through application of the diffusion kernel to areas of the brain where the disease pattern is likely to spread to via the white matter tracts. The predicted future disease patterns may be output in a representation selected from the group of a) a ball and stick model overlaid on a connectivity map of the human brain; b) a table; c) a graph; and d) a color-coded surface map of the brain.

In some embodiments, a method for analyzing the brain of a subject may be applied in the context of testing a medical intervention in a clinical trial conducted under a protocol. Such a method may include taking a medical image of a patient's brain and applying the method described above to predict future changes to the brain of the subject. In this context, administering a medical intervention to the patient may be followed by taking a second medical image of said patient's brain after the time period indicated in the clinical trial protocol, again applying the method described above to obtain new predicted future changes to the brain of the subject, and comparing the results of steps to determine the efficacy of the intervention.

According to another embodiment, a method of analyzing a subject's brain may be used for stratifying subjects that are candidates for a clinical trial or are enrolled in a clinical trial conducted under a protocol is provided. Such a method may include taking a medical image of a subject's brain, applying the method described above to obtain predict future changes to the brain of the subject. By repeating this process for multiple subjects enrolled in the clinical study, the method may output categorizations of each subject into two or more groups, depending on their initial disease pattern based on parcellated images of the subject's brain, output vectors or their predicted future disease patterns. Such stratification of subjects based on analysis of the brain described herein may be used as inclusion or exclusion criteria for a clinical trial and may be repeated throughout the clinical trial.

Figure 2:
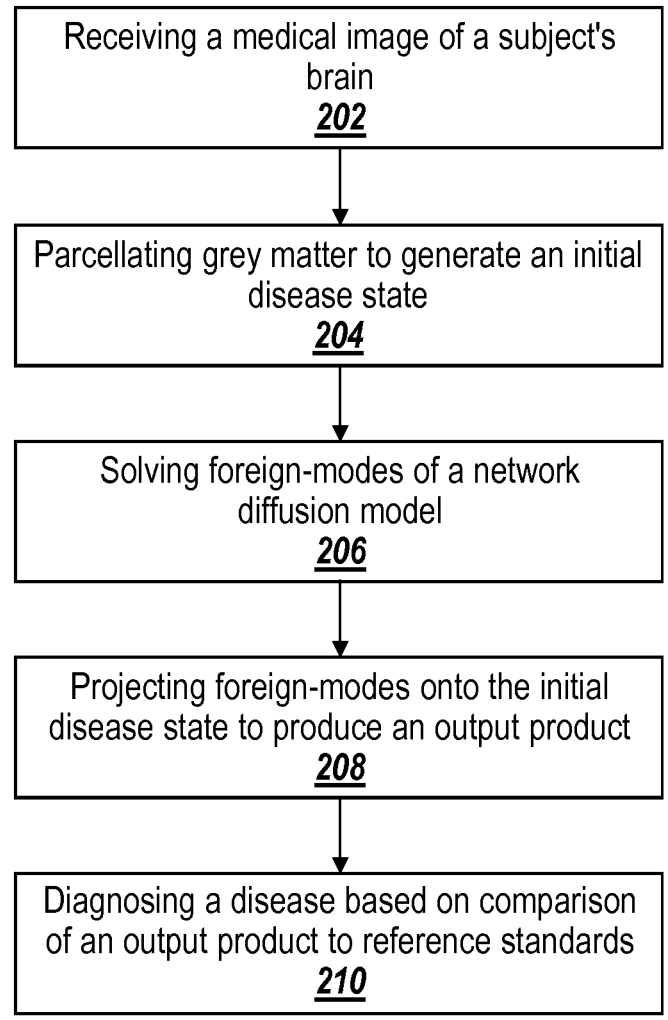
FIG. 2 depicts a flow chart of a method for analyzing a subject's brain in accordance with another illustrative embodiment.

Referring now to FIG. 2, a method for analyzing the brain of a subject begins with receiving a medical image (operation 202). A medical image may be tomographic. The medical image may be diffusion weighted. A diffusion weighted image may be any image from which a measurement of diffusion within any given imaging voxel can be calculated or observed. A voxel, as used here, refers to a fundamental unit of an image representing a 3-dimensional space. The size of voxels in any given image may vary depending on the imaging modality used to acquire the image. The medical image may be acquired by any of a number of different imaging modalities. In terms of the use of dependent neuroanatomic tools, there are many alternatives. The medical image of the subject's brain may be acquired by any of one several available MRI modalities:

T1-weighted, T2-weighted, diffusion weighted, perfusion MRI, etc. Non-MRI imaging can also be used, e.g. FGD-PET and PiB-PET, X-Ray CT, Ultrasound Imaging, optical imaging, fluorescence imaging and other modalities. Any imaging modality which shows a spatial distribution of disease patterns can be used to acquire the medical image. The medical image may be of the entire brain, with no missing regions. The medical image may also be a partial image of the brain.

The medical image may be received via an imaging device, such as an MRI, CT, Ultrasound, Optical imaging, PET, fluorescence imaging apparatus or any other imaging apparatus. The medical image may also be received via a computing device. Receiving the medical image may include retrieving the medical image from a memory coupled to a computing device or retrieving the medical image directly from the imaging apparatus.

In some implementations, parcellating of grey matter of the medical image (operation 204) may be accomplished through use of one of a number of available and disclosed brain atlases. A variety of brain atlases or non-atlas based parcellation methods may be used. In some examples disclosed herein, an 86-region atlas may be used. In other examples, a 90-region atlas may be used. The foregoing examples of atlases herein do not preclude the use of other atlases with other numbers of regions or with alternatively defined regions. The parcellated medical image is a vector that represents an initial disease state. In the case of healthy subjects, this initial disease state may be a lack of neurodegeneration.

Any of the available morphometric analysis tools can be applied, for instance FREESURFER (generated at Martinos Center for Biomedical Imaging in Charlestown, Mass.), SPM, FSL, CIVET, and others. The only requirement is that this tool should output a value for each region in the brain as a table, which we will call the disease pattern in the brain. The method of parcellating the grey matter of the brain into these regions is also variable; any parcellated and labeled atlas could be used, for instance MNI atlas, FREESURFER atlas or the AAL atlas, among others. There can be any number of regions in the parcellation; however, more is usually better. For example in one embodiment, at least 50 regions are in the parcellation. Tractography on diffusion MRI of healthy subjects (for generating initial models) or of one or more subjects, can be performed using any one of currently freely available tools, like TrackVis, Tracula, DTI Studio, ProbtracX in FSL, among others.

For example, to create the initial disease state, grey matter brain regions were parcellated from all subjects' T1-MRI scans using an atlas-based parcellation scheme, IBASPM) to extract 116 regions of interest (ROIs), collected in the vector $v=\{v_i|i\in[1,N]\}$. The mean and standard deviation of the ROI volumes were determined for each disease group. The resulting initial disease state in this example is vector v.

A network connectivity model may be computed from a dataset of healthy subjects. For example, whole brain networks were extracted from HARDI scans of young healthy subjects only, using methodology previously described. Briefly, Q-ball reconstruction and tractography are performed on co-registered MRI/HARDI volumes. Parcellated ROIs are used as seed points for tractography and connection strength $c_{i,j}$ of each ROI pair i,j is estimated by weighted sum of all tracts terminating in the two regions. Cerebellar structures are removed, giving a symmetric 90×90 connectivity matrix for each young healthy subject. Generation of a network diffusion model is discussed in greater detail below.

Figure 11A:
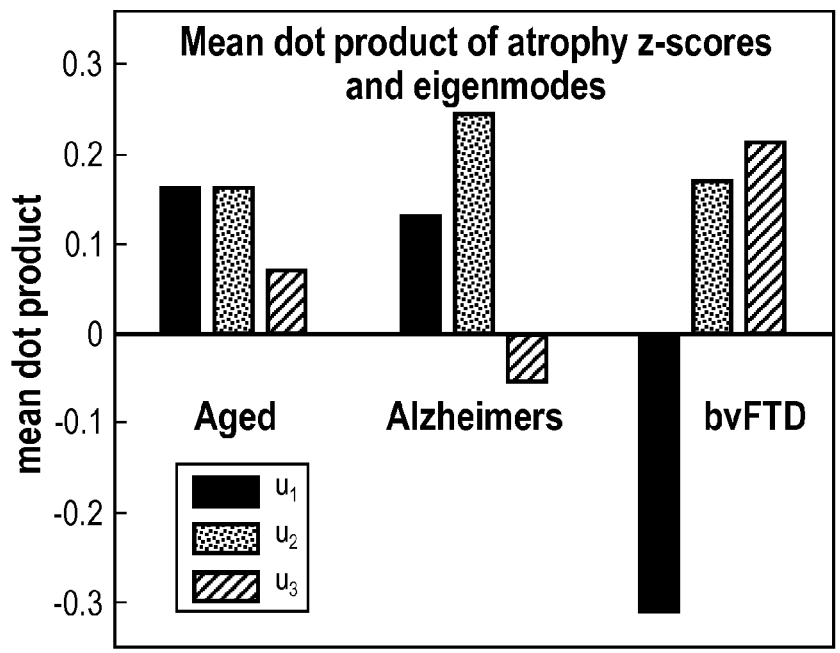
FIG. 11A depicts a mean dot product between atrophy and the first 3 eigen-modes for each dementia group in accordance with an illustrative embodiment.

The eigen-modes of a connectivity matrix are solved for (operation 206) by the eigen-value decomposition of the subject's connectivity matrix, the corresponding Laplacian matrix, a connectivity matrix of one or a composite of a plurality of other subjects, or the Laplacian matrix thereof. Solving for eigen-modes of a connectivity matrix is discussed in greater detail below. In some implementations, each eigen-mode so generated corresponds to stereotyped patterns of disease in various neurodegenerative diseases. Projecting eigen-modes onto the initial disease state to obtain an output product (operation 208) may include taking a projection of each eigen-mode with the subject's atrophy or disease pattern, e.g. via a vector dot product, and obtain from the resulting projection data a measure of the presence and strength of corresponding neurodegenerative diseases in that subject's brain by measuring contributions of different eigen-modes. This measure is the output product. Diagnosing of a disease based comparison of the output product to reference standards. Diagnosis includes comparison of the output product to reference standards including projections of eigen-modes onto known disease patterns. FIG. 11A depicts examples of such reference standards associated normal aging, Alsheimer's disease and behavioral frontotemporal dimensia. In other embodiment, additional reference standards may be generated by projection of eigenmodes onto other known disease states or atrophy patterns associated with known diseases. Projections of different eigen-modes onto the subject's medical image, specifically their initial disease state, may be used for diagnosis quantitatively amongst different neurodegenerative and other neurological disorders by determining which eigen-mode correlates the most with the initial disease states. This quantitative approach to comparison of the output product may include comparing vector dot products, such as those depicted in FIG. 11A. Other statistical or graphical approaches may also be taken to compare output products to reference standards. In some embodiments, output products may be compared to reference standards qualitatively by visual or graphical comparison. For example, diagnosis may be obtained for one or more of: Alzheimer, frontotemporal dementia, Parkinson's, corticobasal syndrome, semantic dementia, progressive nonfluent aphasia, ALS, epilepsy and more diseases involving neurodegeneration. Projection of eigen-modes onto initial disease states are discussed in greater detail below.

In some embodiments, a method for analyzing the brain of a subject may be applied in the context of testing a medical intervention in a clinical trial conducted under a protocol. Such a method may include taking a medical image of a patient's brain and applying the method described above to predict future changes to the brain of the subject. In this context, administering a medical intervention to the patient may be followed by taking a second medical image of said patient's brain after the time period indicated in the clinical trial protocol, again applying the method described above to obtain new output products and diagnoses, and comparing the results of steps to determine the efficacy of the intervention.

According to one embodiment, a method of analyzing a subject's brain may be used for stratifying subjects that are candidates for a clinical trial or are enrolled in a clinical trial conducted under a protocol is provided. Such a method may include taking a medical image of a subject's brain, applying the method described above to obtain diagnosis of the subject. By repeating this process for multiple subjects enrolled in the clinical study, the method may output categorizations of each subject into two or more groups, depending on their initial disease pattern based on parcellated images of the subject's brain, output products or the diagnosis based on comparison of the output product to reference standards. Such stratification of subjects based on analysis of the brain described herein may be used as inclusion or exclusion criteria for a clinical trial and may be repeated throughout the clinical trial.

Figure 3:
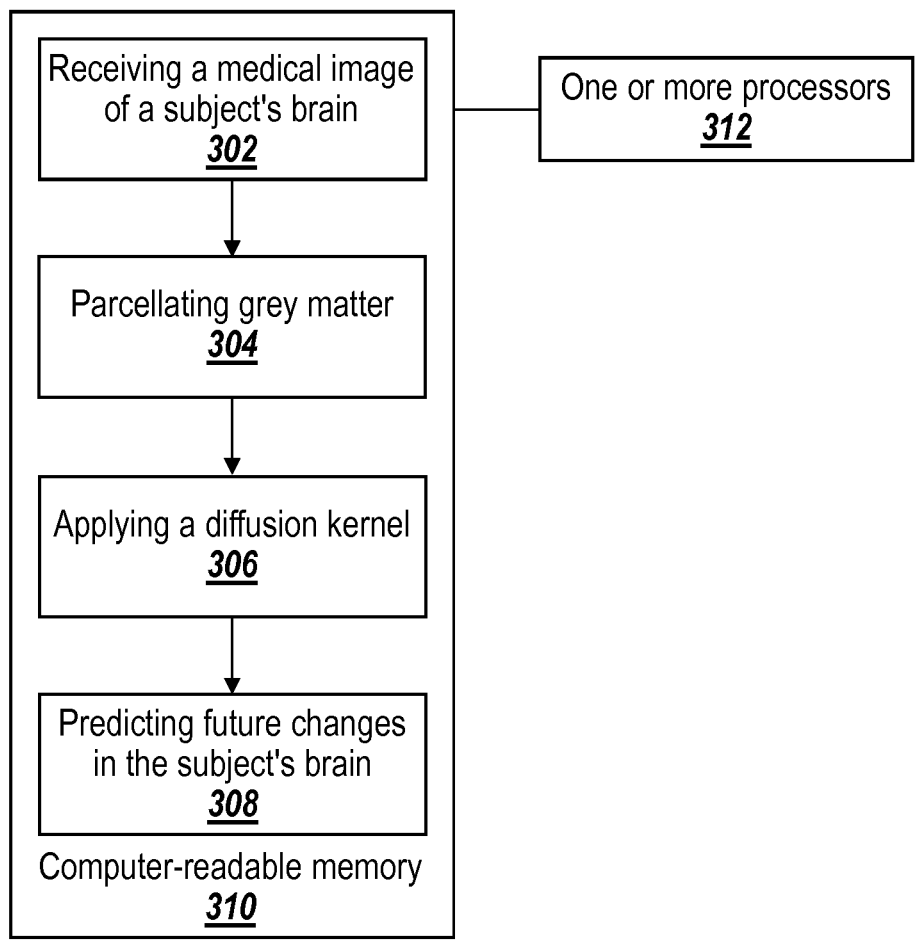
FIG. 3 depicts a system for analyzing a subject's brain in accordance with an illustrative embodiment.

FIG. 3 depicts a system for analyzing a subject's brain. A computer-readable memory (310) is coupled to one or more processors (312). The computer-readable memory holds instructions for receiving a medical image of a subject's brain (operation 302), parcellating grey matter in the medical image of the subject's brain (operation 304), applying a diffusion kernel (operation 306), and predicting future changes to the subject's brain (operation 208).

Still referring to FIG. 3, in greater detail, receiving a medical image of a subject's brain may include receiving an image acquired by MRI, CT, Ultrasound, Optical imaging, PET, fluorescence imaging or any other medical imaging modality. Receiving a medical image of a subject's brain may also include retrieving the image from an electronic computing device or computer-readable storage medium.

Still referring to FIG. 3, instructions are stored causing the one or more processors to receive a medical image of a subject's brain (operation 302) then parcellate grey matter in the medical image of the subject's brain (operation 304). Parcellating the grey matter may be accomplished through use of one of a number of available and disclosed brain atlases. A variety of brain atlases or non-atlas based parcellating methods may be used. In some examples disclosed herein, an 86-region atlas may be used. In other examples, a 90-region atlas may be used. The examples of those atlases herein do not preclude the use of other atlases with other numbers of regions or with alternatively defined regions. In some implementations, the parcellated medical image may represent an initial neurodegenerative disease state. In the case of healthy subjects, this initial disease state may be a lack of neurodegeneration.

Applying a diffusion kernel (306) may include applying a function that simulates a diffusion process in the brain as described below and shown in equation (3) to a matrix that represents the voxels or pixels in the medical image. The diffusion kernel may be $e^{-\beta Ht}$ and may be used to predict the spread of a disease-causing proteinopathic agent through the brain. Applying a diffusion kernel (306) may include reconstructing a diffusion-weighted tomographic image of the subject's brain into a set of orientation distribution functions (ODFs) defined on voxels of the image, these ODFs are subsequently applied to a tractography algorithm to obtain a set of white matter tracts between brain regions, and the connectivity network between these regions may be computed. From these connectivity networks, a diffusion kernel may be obtained, which is an operator defined on the network's connectivity matrix. The diffusion kernel is not restricted to the specific form shown in the example above (i.e. $e^{-\beta Ht}$), but can be any linear or non-linear operator that has a correspondence to a linear or non-linear differential equation of any order or degree defined on this network. The diffusion kernel is a function of the subject's connectivity matrix or its Laplacian matrix, and it can be a function of time as well. The application of the diffusion kernel may correspond to a matrix-vector multiplication with an initial brain state measured by a medical image, if the diffusion kernel is linear, or to a non-linear operator applied to the initial brain state, if the diffusion kernel is non-linear.

A diffusion kernel, calculated from the subject's connectivity matrix which may be obtained from a variety of images including MRI, diffusion-eighted MRI, functional MRI, resting-state functional MRI, PET, EEG and MEG, may be a linear or non-linear operator defined on the connectivity matrix or Laplacian matrix corresponding to the subject's connectivity network. The application of the diffusion kernel (operation 306) involves converting the initial disease pattern to a vector, and then performing the linear or non-linear operation indicated by the diffusion kernel on this initial vector. The resulting output vector of this operation encapsulates future predictions regarding the subject's future disease states and their topographic distribution on the brain. Future changes to the brain of the subject are predicted based on the output vector (operation 308) The predicted future disease patterns may be output in a representation selected from the group of a) a ball and stick model overlaid on a connectivity map of the human brain; b) a table; c) a graph; and d) a color-coded surface map of the brain.

Figure 4:
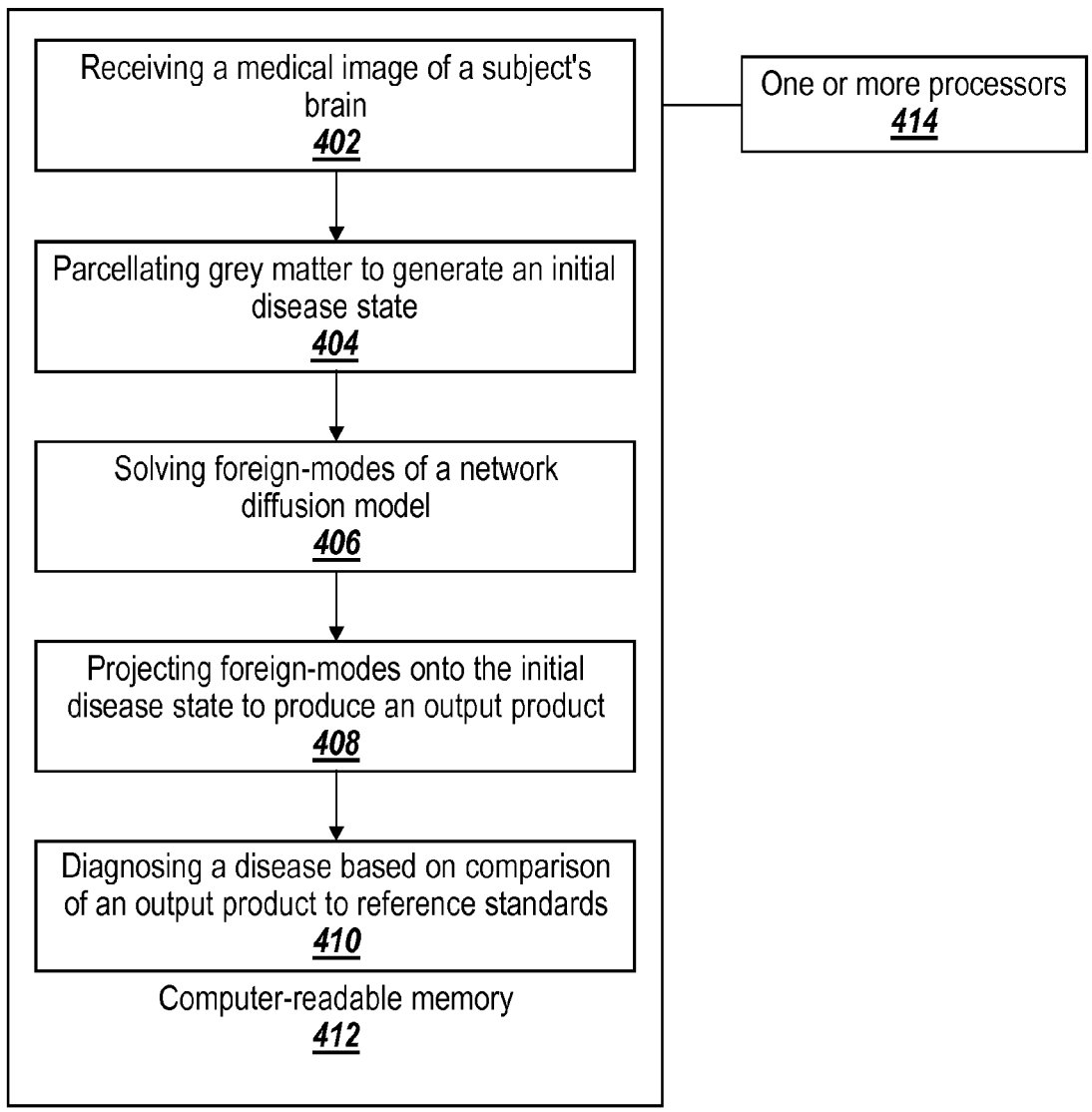
FIG. 4 depicts a system for analyzing a subject's brain in accordance with another illustrative embodiment.

FIG. 4 depicts a system for analyzing a subject's brain. A computer-readable memory (410) is coupled to one or more processors (412). The computer-readable memory holds instructions for receiving a medical image of a subject's brain (operation 402), parcellating grey matter in the medical image of the subject's brain to obtain an initial disease state (operation 404), solving for eigen-modes in a connectivity matrix (operation 406), projecting eigen-modes onto the initial disease state to produce an output product (operation 208) and diagnosing a disease or lack thereof in the subject based on the comparison of the output product to reference standards.

Still referring to FIG. 4, in greater detail, receiving a medical image of a subject's brain may include receiving an image acquired by MRI, CT, Ultrasound, Optical imaging, PET, fluorescence imaging or any other medical imaging modality. Receiving a medical image of a subject's brain may also include retrieving the image from an electronic computing device or computer-readable storage medium.

Still referring to FIG. 4, instructions are stored causing the one or more processors to receive a medical image of a subject's brain (operation 402) then parcellate grey matter in the medical image of the subject's brain (operation 404). Parcellating the grey matter may be accomplished through use of one of a number of available and disclosed brain atlases. A variety of brain atlases or non-atlas based parcellating methods may be used. In some examples disclosed herein, an 86-region atlas may be used. In other examples, a 90-region atlas may be used. The examples of those atlases herein do not preclude the use of other atlases with other numbers of regions or with alternatively defined regions. In some implementations, the parcellated medical image may represent an initial neurodegenerative disease state. In the case of healthy subjects, this initial disease state may be a lack of neurodegeneration.

The eigen-modes of a connectivity matrix are solved for (operation 406) by the eigen-value decomposition of the subject's connectivity matrix, the corresponding Laplacian matrix, a connectivity matrix of one or a composite of a plurality of other subjects or the Laplacian matrix thereof. Solving for eigen-modes of a connectivity matrix is discussed in greater detail below. In some implementations, each eigen-mode so generated corresponds to stereotyped patterns of disease in various neurodegenerative diseases. Projecting eigen-modes onto the initial disease state to obtain an output product (operation 408) may include taking a projection of each eigen-mode with the subject's atrophy or disease pattern, e.g. via a vector dot product, and obtain from the resulting projection data a measure of the presence and strength of corresponding neurodegenerative diseases in that subject's brain by measuring contribution of different eigen-modes. This measure is the output product. Diagnosing of a disease based comparison of the output product to reference standards. Diagnosis includes comparison of the output product to reference standards including projections of eigen-modes onto known disease patterns. FIG. 11A depicts examples of such reference standards associated normal aging, Alsheimer's disease and behavioral frontotemporal dimensia. Additional reference standards may be generated by projection of eigen-modes onto other known disease states or atrophy patterns associated with known diseases. Projections of different eigen-modes onto the subject's medical image, specifically their initial disease state, may be used for diagnosis quantitatively amongst different neurodegenerative and other neurological disorders by determining which eigen-mode correlates the most with the initial disease states. This quantitative approach to comparison of the output product may include comparing vector dot products, such as those depicted in FIG. 11A. Other statistical or graphical approaches may also be taken to compare output products to reference standards. In some embodiments, output products may be compared to reference standards qualitatively by visual or graphical comparison. For example, diagnosis may be obtained for one or more of: Alzheimer, frontotemporal dementia, Parkinson's, corticobasal syndrome, semantic dementia, progressive nonfluent aphasia, ALS, epilepsy and more diseases involving neurodegeneration. Projection of eigen-modes onto initial disease states are discussed in greater detail below.

The network diffusion model is a new computational tool which includes a diffusion kernel and eigen modes and has many important commercial and scientific uses. These include: dimensionality reduction, differential diagnosis and most importantly, prediction of future atrophy using baseline MRI morphometrics. Below we describe each application briefly, but first we list example neurological diseases to which these applications can be used.

Eigen decomposition of a connectivity matrix, either the connectivity matrix of the subject, a connectivity matrix obtained from imaging of one or more healthy subjects or a connectivity matrix associated with a network connectivity model, gives the brain network's eigen-modes, which we showed are an effective basis for dimensionality reduction of atrophy in dementia, producing even better classification accuracy than the optimal basis identified by Principal Components Analysis. This provides a role for our model in unsupervised, automated and regionally unbiased differential diagnosis of various dementias. Instead of dealing with high-dimensional and complex whole brain atrophy patterns, neuroradiologists can simply look at the relative contribution of the first 3-4 eigen-modes in any person's brain, and treat them as clinical biomarkers. This approach can be especially helpful in cases of mixed dementia, where classical region-based atrophy descriptors might prove unsatisfactory. Although many machine learning and classification tools exist to separate subjects into different disease groups (AD, MCI, healthy, etc.), they do not provide physiologically realistic summary features onto which brain atrophy patterns can be projected. Our work provides this ability.

The first (steady-state) eigen-mode whose eigen value is zero is not shown, varying simply according to region size in rough correspondence to atrophy seen in normal aging. In order to ensure that these results are not due to a specific choice of volumetric algorithm or choice of anatomic atlas, the same study using volumetric data obtained by the FreeSurfer software and a different 86-region atlas is repeated, resulting in a reference standard for normal aging.

The $2^{nd}$ eigen-mode (FIGS. 6, 8) closely resembles typical Alzheimer's atrophy in mesial temporal, posterior cingulate, limbic structures, lateral temporal and dorso-lateral frontal cortex. This eigen-mode shows strong involvement of the medial and lateral temporal lobes, which are involved in memory; and the dorsolateral prefrontal cortex, implicated in working memory. These functions are typically impacted in AD pathology. The main fibers connecting these regions are the superior longitudinal fasciculus (SLF), splenium of corpus callosum and the cingulum bundle. FIGS. 6 and 8, discussed in greater detail below, are also examples of reference standards that may be used for diagnosis of Alzheimer's disease.

The $3^{rd}$ eigen-mode (FIGS. 7, 9) is in good agreement with our bvFTD data (FIGS. 7, 9) and published findings, which indicate prominent atrophy in orbitofrontal and anterior cingulate regions. This eigen-mode is particularly strong in the lateral temporal lobe and many frontal regions like the superior, dorsolateral and orbital cortices—areas that deal with higher mental functions like executive function, decision making, expectation, and balancing risk versus reward and inhibition. Degeneration of the orbitofrontal cortex was linked to disinhibited behavior, and the superior frontal gyrus has been associated with self-awareness. The main fiber bundles connecting these regions are the SLF, genu of corpus callosum and the uncinate fasciculus.

Figure 7:
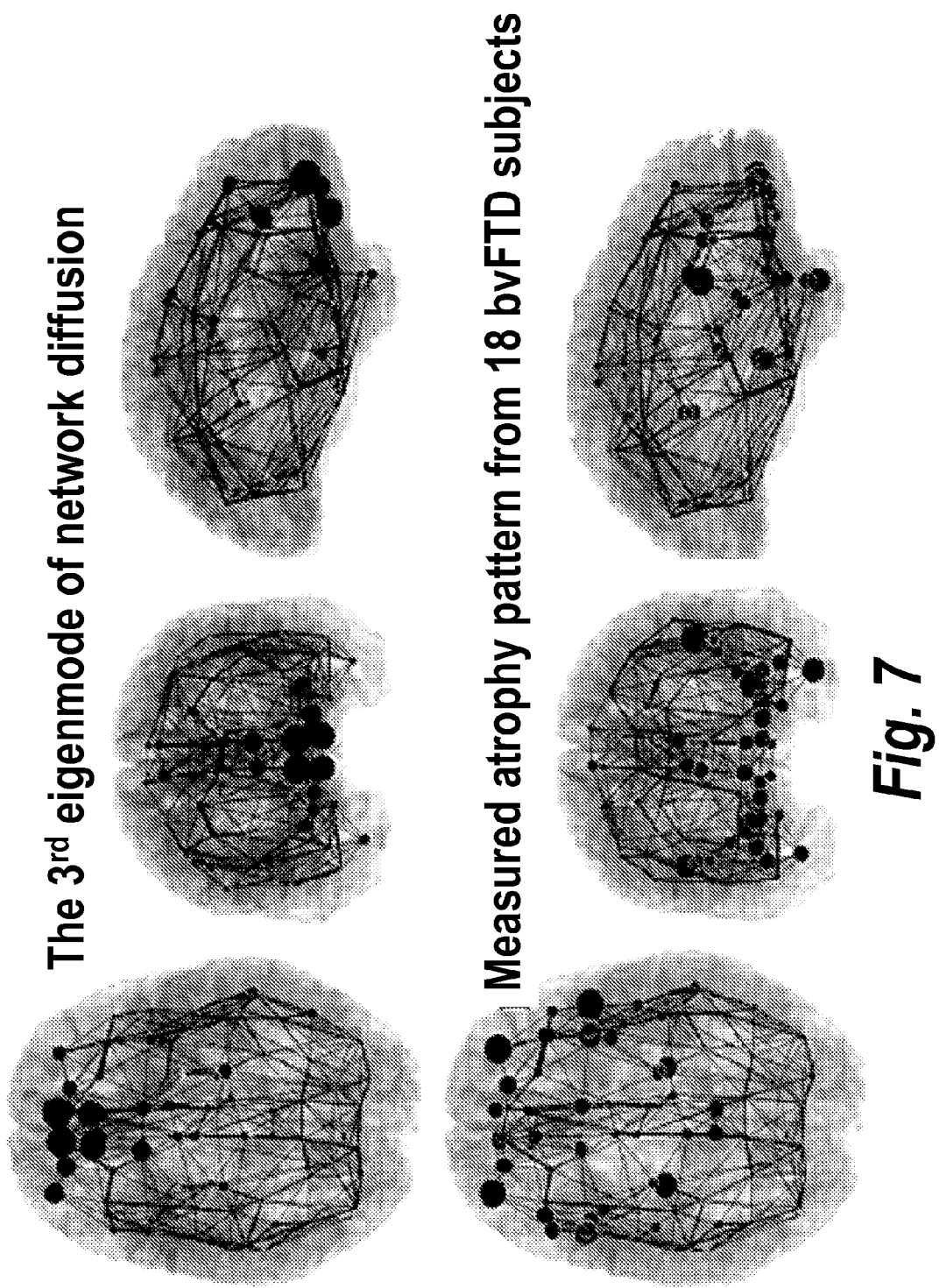
FIG. 7 depicts visual correspondence between an eigen-mode of a healthy brain and a measured neurodegeneration pattern of behavioral frontotemporal dementia in accordance with an illustrative embodiment.

The clear temporal and frontal involvement predicted by our model is, if anything, closer to the classic bvFTD patterns than is shown by our bvFTD subjects. We attribute these discrepancies to clinical heterogeneity in our bvFTD cohort, whose risk of misdiagnosis based purely on clinical presentation (Neary et al. 1998) is high, around 20-30%, and pathological heterogeneity. Temporal atrophy commonly attributed to bvFTD might represent a different disease altogether. Finally, early bvFTD is known to affect frontal regions primarily but spreads to the temporal lobe over time. This behavior is predicted by our model: after the $3^{rd}$ eigen-mode corresponding to bvFTD has run its course (half life $1/\lambda_3$), subsequent degeneration will primarily follow eigen-mode 2 (much longer half life $1/\lambda_2$) corresponding to AD and exhibiting prominent temporal involvement. This may also explain repeated findings of AD pathology in clinically diagnosed bvFTD. FIGS. 7 and 9 are examples of reference standards that may be used for bvFTD diagnosis.

Figure 16:
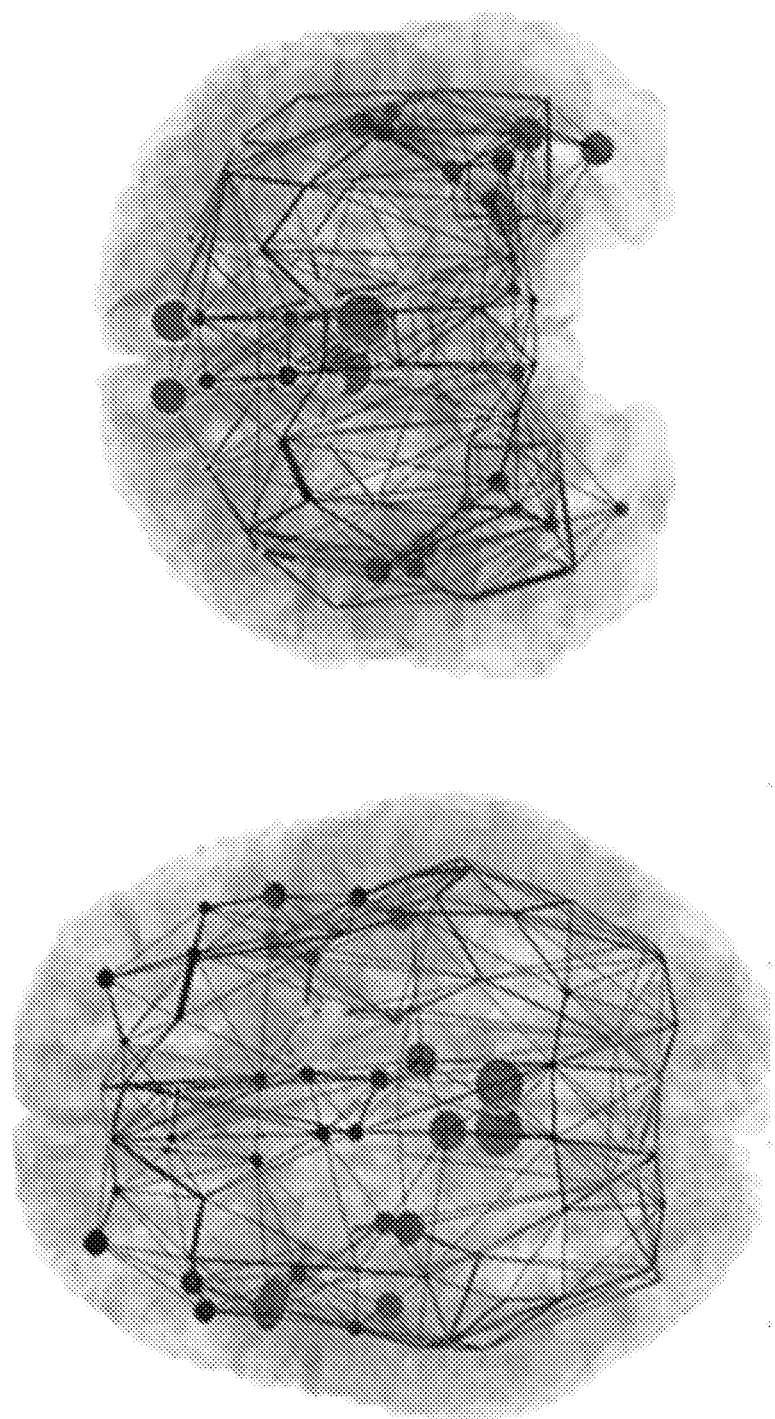
FIG. 16 depicts ball-wire representations of the 4th eigen-mode of the healthy brain network Laplacian matrix H in accordance with an illustrative embodiment.

The $4^{th}$ and higher eigen-modes capture less frequently occurring degenerative processes as well as the heterogeneity found in common dementias. Since higher modes are eventually overtaken by more persistent modes, they are harder to isolate in aged populations. The parietal and cingulate atrophic pattern of the $4^{th}$ eigen-mode in FIG. 16 correlates with patterns found in Huntington's disease and cortico-basal degeneration and is an example of a reference standard that may be used for qualitative diagnosis of Huntington's disease.

Taken together, the spatial patterns described by our eigen-modes are homologous to dementia patterns described in several studies, to our own small sample of AD and bvFTD subjects, as well as to recently observed resemblance to spatially distinct networks characterized internally by close functional correlations. These studies may provide additional reference standards, both quantitative and qualitative, for diagnosis of AD and bvFTD.

Solving for Eigen-Modes

With respect to the mathematical modelling described below, the network diffusion equation (1) may be easily replaced by another one, based on tweaked or refined differential equations of order greater than 1. This would lead to a different closed form solution (3), but as long as the model is deterministic, and has an explicit time dependency, all the subsequent analysis and application will remain similar. For instance, we could replace the first order differential equation by second order, and re-derive a closed form solution of future atrophy patterns.

The brain's anatomic connectivity network is represented by a graph G={V,E} whose nodes $v_i \in V$ represent the $i^{th}$ cortical or subcortical grey matter structure, and whose edges $e_{i,j} \in E$ represent white matter fiber pathways connecting structures i,j. Structures $v_i$ comes from parcellation of brain images, and connection strength $c_{i,j}$ is measured by fiber tractography. The disease-causing proteinopathic agent is represented by the vector $x(t)=\{x(v,t), v \in V\}$ at any given point of time t at each node in the network. We found that dementia progression into this network in a diffusive manner is well captured by a so-called network heat equation.

$$\frac{dx(t)}{dt} = -\beta H x(t) \quad (1)$$

where H is the graph Laplacian, with $$H_{i,j} = \begin{cases} -c_{i,j} & \text{for } c_{i,j} \neq 0 \\ \sum_{i,j':e_{i,j'} \in \varepsilon} c_{i,j'} & \text{for } i = j \\ 0 & \text{otherwise} \end{cases} \quad (2)$$

This is the graph-equivalent of the Laplacian diffusion operator $\Delta x \triangleq \nabla^2 x$. Since all brain regions are not the same size, each row and column of the Laplacian is normalized by their sums. This model only considers the long-range transmission of proteopathic carriers, and not on their local "leaking" via synapses and dendrites, because we are interested only in the large-scale macroscopic patterns rather than the local microenvironment of the disease within a single gray matter region. The cortical atrophy in region k as a consequence of protein accumulation x(t) was modeled as the integral $$\phi_k(t) = \int_0^t x_k(\tau) d\tau$$

On the whole brain this gives $(t) = \int_0^t x(\tau) d\tau$. From matrix algebra, eq. (1) is satisfied by $$x(t) = e^{-\beta H t} x_0 \quad (3)$$

where $x_0$ is the initial pattern of the disease process, on which the term $e^{-\beta H t}$ acts essentially as a spatial and temporal blurring operator. We therefore call $e^{-\beta H t}$ the diffusion kernel, and eq. (3) is interpreted as the impulse response function of the network. Since the above requires matrix exponentiation, it is solved via the eigen-decomposition of the network Laplacian H into a number of "eigen-modes" into which the diffusive process will get trapped, and the evolution of the disease pattern will be governed by these eigen-modes:

$$x(t) = U e^{-\Lambda \beta t} U^\dagger x_0 = \sum_{i=1}^N (e^{-\beta \lambda_i t} u_i^{554} x_0) u_i \quad (4)$$

The eigenvalues $\lambda_i$ of the Laplacian H are in the interval [0, 1], with a single 0 eigenvalue and a small number of near-zero eigenvalues. Most eigen-modes $u_i$ correspond to large eigenvalues that quickly decay due to exponentiation, leaving only the small eigen-modes, whose absolute values we denote by "persistent modes", to contribute.

Here we describe how to use the above model to predict future patterns of disease in neurodegeneration.

Dynamics.

The time evolution of hypothesized atrophy is a linear combination of eigen-modes $$\Phi(t) = \int_0^t \sum_{i=1}^n (e^{-\beta \lambda_i t} u_i^\dagger x_0) u_i dt = \sum_{i=1}^n \frac{1}{\beta \lambda_i} (1 - e^{-\beta \lambda_i t}) u_i^\dagger x_0 u_i \quad (5)$$

consisting of a sum of two parts, a deterministic exponential part and a case-dependent random part determined by the initial configuration $x_0$ of the disease.

The model may further predict disease progression.

Prediction of future atrophy Expanding eq. (5) in terms of the eigen-decomposition, we get $$\Phi(t) = \int_0^t e^{-H\beta t} x_0 dt = U \frac{1}{\beta} \Lambda^{-1} (I - e^{-\Lambda \beta t}) U^\dagger x_0$$

$$= U \operatorname{diag}\left(\left\{\begin{array}{ll} t, & i=1 \\ \frac{1-e^{-\lambda_i \beta t}}{\beta \lambda_i}, & i>1 \end{array}\right\}\right) U^\dagger x_0$$

The last expression is necessitated by the fact that $\lambda_i$–0, which gives $$\lim_{\lambda_1 \to 0} \frac{1 - e^{-\lambda_1 \beta t}}{\lambda_1 \beta} = t.$$

Note also that early in the disease. Assuming that MCI operates in this early region, we may assign $\Phi_{MCI}(t_{baseline}) \approx t_{baseline} x_0$, and $$\Phi_{MCI}(t) = \frac{1}{\beta t_{baseline}} U \operatorname{diag}\left(\left\{\begin{array}{ll} \beta t, & i=1 \\ \frac{1-e^{-\lambda_i \beta t}}{\lambda_i}, & i>1 \end{array}\right\}\right) U^\dagger \Phi_{MCI}(t_{baseline})$$

Prediction of future atrophy in patients may be performed using the above equation. Although the actual amount of predicted future atrophy depends on t_baseline, the latter is generally unknown for a given subject (it would depend on the age of onset), the correlation between predicted and measured longitudinal atrophy patterns is independent of t_baseline, and is therefore omitted from the analysis.

Figure 5:
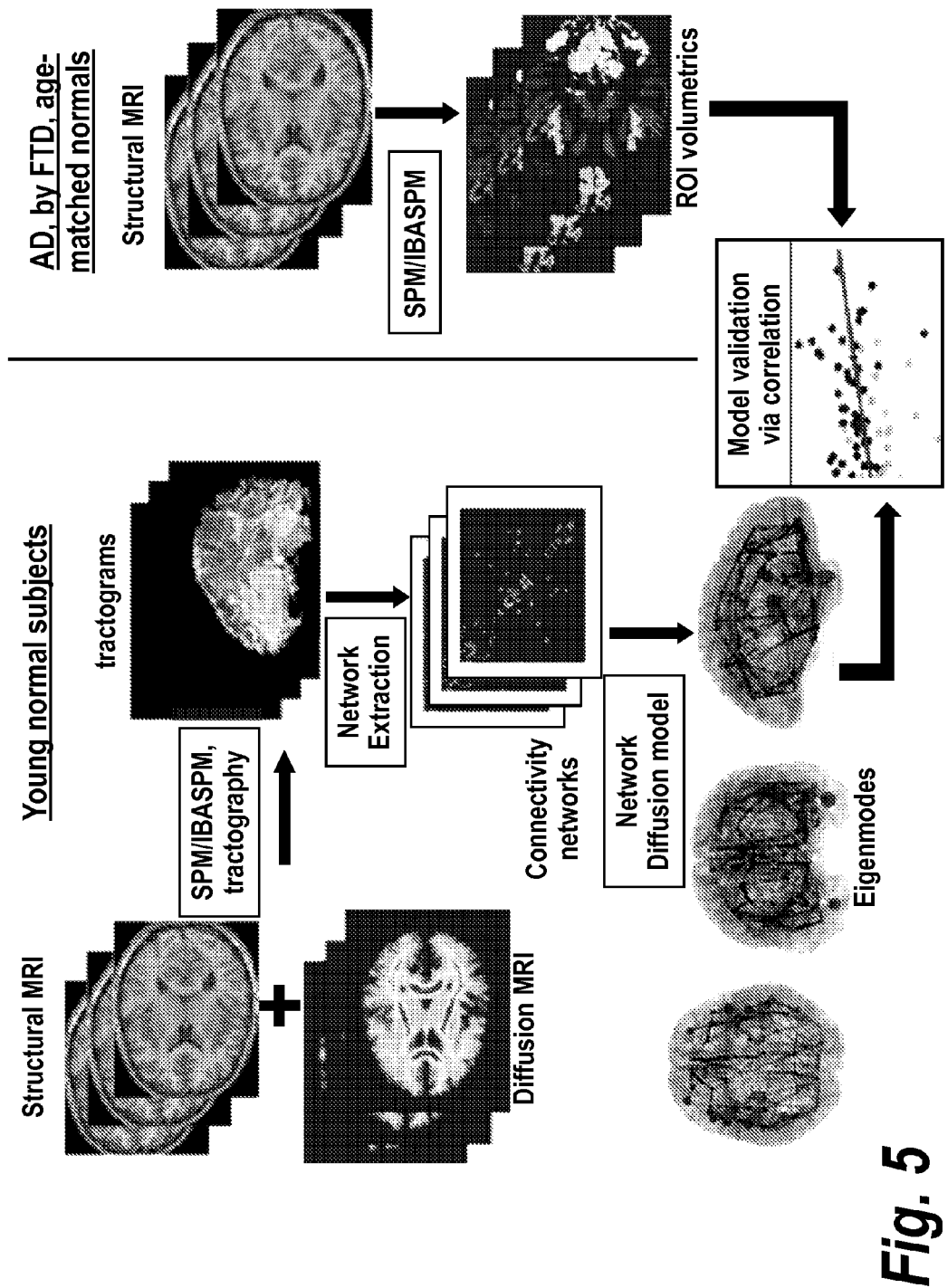
FIG. 5 depicts a process flow chart of a method and verification of the analysis disclosed herein in accordance with an illustrative embodiment.

FIG. 5 depicts an overview of the datasets and processing steps in accordance with an illustrative embodiment, with network analysis using 14 healthy young subjects (left panel) and volumetric analysis of T1-weighted MRI scans of 18 AD, 18 bvFTD and 19 age-matched normal subjects (right panel). In the left panel, structural healthy brain networks were obtained from diffusion MRI scans of 14 young healthy volunteers, followed by whole brain tractography. The nodes of this network correspond to cortical and sub-cortical gray matter regions obtained from a labeled T1-weighted brain atlas, and the edges of this network are proportional to the number and strength of the fiber tracts that connect the nodes. A proposed network diffusion model and its eigen-modes are derived from this healthy network.

The first 3 eigen-modes, which are predictive of dementia atrophy patterns, are tabulated and plotted. In the right panel, the predicted patterns are compared with measured atrophy of dementia patients (AD, bvFTD and age-matched normal subjects), obtained via a completely separate processing pipeline available in the SPM Matlab toolbox. T1-weighted images of each subject are co-registered with the same atlas as in the left panel, and gray matter regions are parcellated using the pre-labeled atlas information. A volume of each cortical and sub-cortical gray matter region is measured. The atrophy of each region was obtained in terms of a t-statistic between the diseased and age-matched normal groups. The predicted and measured atrophy patterns are statistically compared using correlation analysis.

The t-statistic of cortical volumes of AD and bvFTD subjects, normalized by young healthy controls, are shown in FIGS. 5 and 6 as wire-and-ball plots, along with the values of the first 3 eigen-modes of the healthy network evaluated at the same brain regions as those used to measure atrophy in the diseased brains. The wires denote network connections and the size of each ball is proportional to the atrophy level in that ROI (normalized by ROI size), and the color denotes lobar membership. ROIs showing negative atrophy are considered statistical noise and are not shown.

FIG. 7 depicts visual correspondence between theoretical prediction in the top panel (the $3^{rd}$ eigen-mode of young healthy whole brain connectivity network's Laplacian matrix) and measured atrophy patterns (t-statistic) in the bottom panel in our 18 bvFTD subjects. A close homology is observed between the theoretical and measured atrophy patterns.

FIG. 8 presents the t-scores of cortical atrophy values mapped on the cortical surface of the 90-region cerebral atlas. Atrophy as well as eigen-mode values are mapped by pseudocolor as shown in the color bar. Extreme levels (2 or more standard deviations away from mean values) are assigned the maximum/minimum color in order to facilitate visual interpretation. Since the colors are uniform within each ROI, the apparent spatial resolution of these surface renderings may be somewhat deceptive. Note that the ball-wire plots are not directly comparable due to the above color scaling and absence of sub-cortical structures in the surface maps. The crucial observation is that persistent eigen-modes of network diffusion appear homologous to characteristic atrophy patterns observed in various dementias.

FIG. 8 depicts t-scores of cortical atrophy of AD and bvFTD, and the $2^{nd}$ and $3^{rd}$ eigen-modes, mapped onto the cortical surface using the 90-region AAL cerebral atlas. Atrophy as well as eigen-mode values were converted into z-scores and mapped to the range shown by the colorbar. Extreme levels (2 or more standard deviations away from mean value) were assigned the maximum/minimum color. Eigen-modes resemble the classic atrophy patterns seen in each disease.

FIG. 9 depicts cortical atrophy and eigen-modes mapped onto the cortical surface using a different, 86-region Free-Surfer atlas. Volumetric data were obtained by the Free-Surfer software and the brain network was also re-computed under this new parcellation. Measured atrophy patterns generally match the cortical atrophy seen using the AAL atlas (FIG. 8), but exact match is not to be expected due to both methodological as well as ROI size and shape differences. Importantly, however, measured atrophy is still roughly in accordance with the eigen-modes, which remain consistent with classic AD/bvFTD pathology.

Figure 10:
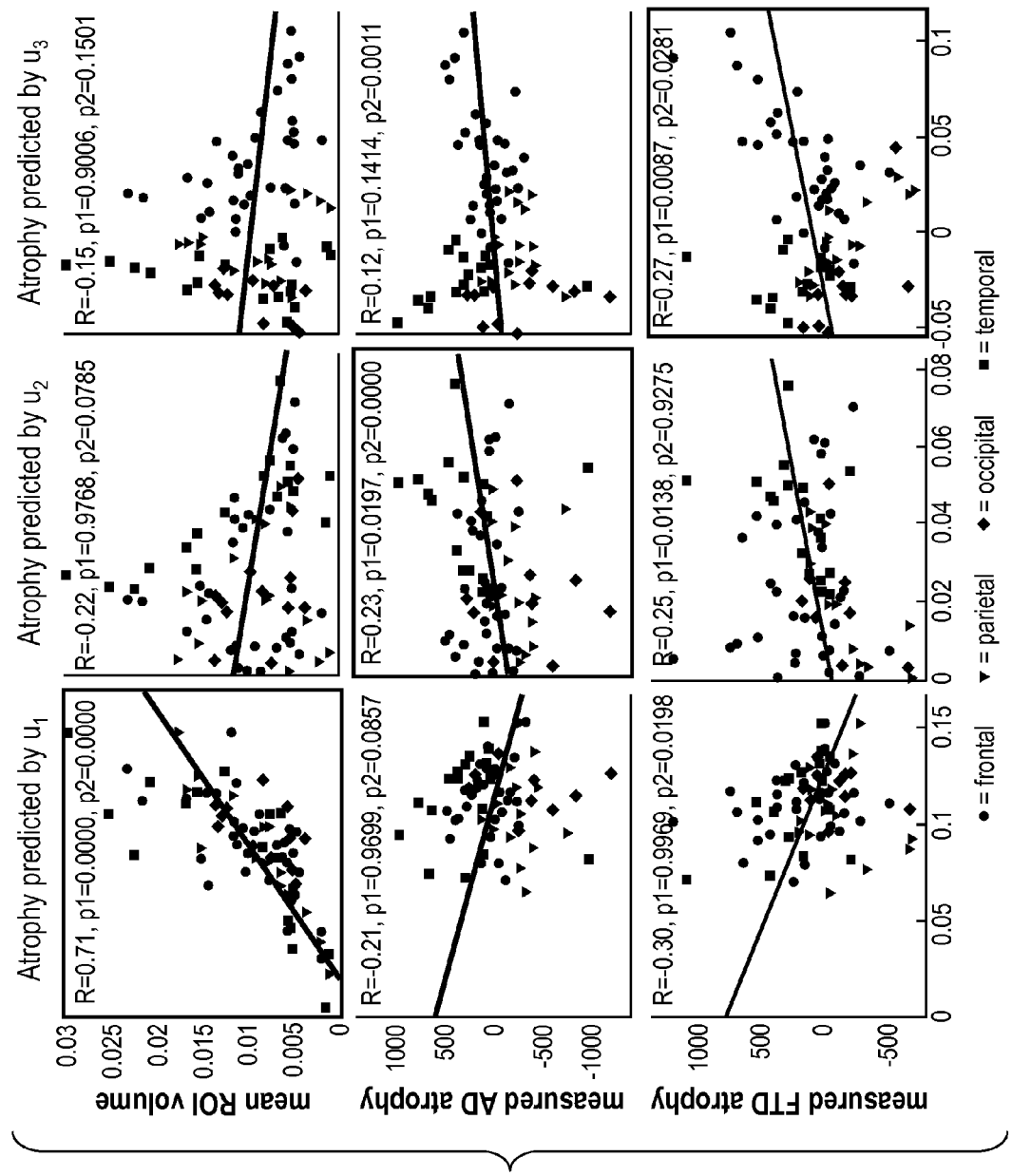
FIG. 10 depicts correlations between measured atrophy of AD/bvFTD versus predicted atrophy from the first 3 eigen-modes of young healthy network in accordance with an illustrative embodiment.

In FIG. 10, the x-axis in each panel is a measured statistic: normal ROI volume (top row), t-score of ROI volume of AD vs age-matched control groups (middle row), and t-score of ROI volume of bvFTD vs age-matched control (bottom row). The y-axis in each panel is an eigen-mode of healthy network: $u_1$ (left column), $u_2$ (middle column), $u_3$ (right column) Each dot in the scatter plots represents a single GM region, and is color coded by lobe. A line of best fit is also shown in each panel. Correlations within diagonally located panels are high, and correlations in off-diagonal panels are low. Plots which show significance in both Pearson correlation as well as the 2-group t-test are indicated by green boxes, and they are along the diagonal panels. This validates the hypothesis that there is a one-to-one correspondence between eigen-modes and dementia atrophy.

Figure 17:
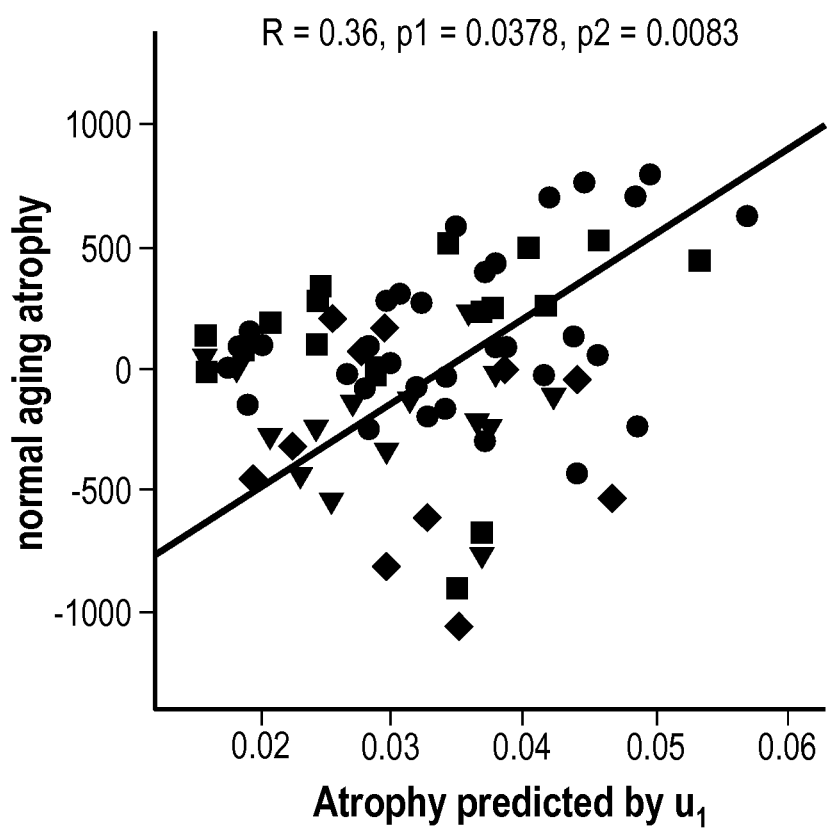
FIG. 17 depicts a plot of the correlation between normal aging atrophy measured from 19 aged but cognitively normal subjects, and the 1st eigen-mode of the young healthy brain network's Laplacian matrix in accordance with an illustrative embodiment.

As depicted in FIG. 8, measured atrophy patterns generally match the cortical atrophy seen using the AAL atlas, but exact match is not to be expected due to both methodological as well as ROI size and shape differences. Importantly however, the visual correspondence between eigen-modes and atrophy remains intact, and the former generally agree with classic AD/bvFTD pathology. The fact that this correspondence holds regardless of the volumetric methodology or the atlas used for parcellation and network generation shows that these results are not methodology-specific. We show (FIGS. 16 and 17) that our results are also insensitive to inter-subject variability.

In some implementations prediction may be made by explicitly defining a starting location of a given disease. For instance, in AD the most likely origin of disease is thought to be the hippocampus or the entorhinal cortex. In Parkinson's disease the substantia nigra is considered to be the originator of alpha-synucleopathic spread into the rest of the brain network. This context can be incorporated in our model by designating the originating region as a "seed" region, which then defines the starting configuration $x_0$. Subsequent spread within the brain is then completely deterministic and is orchestrated by the connectivity network via the dynamic equation (3).

Figure 13:
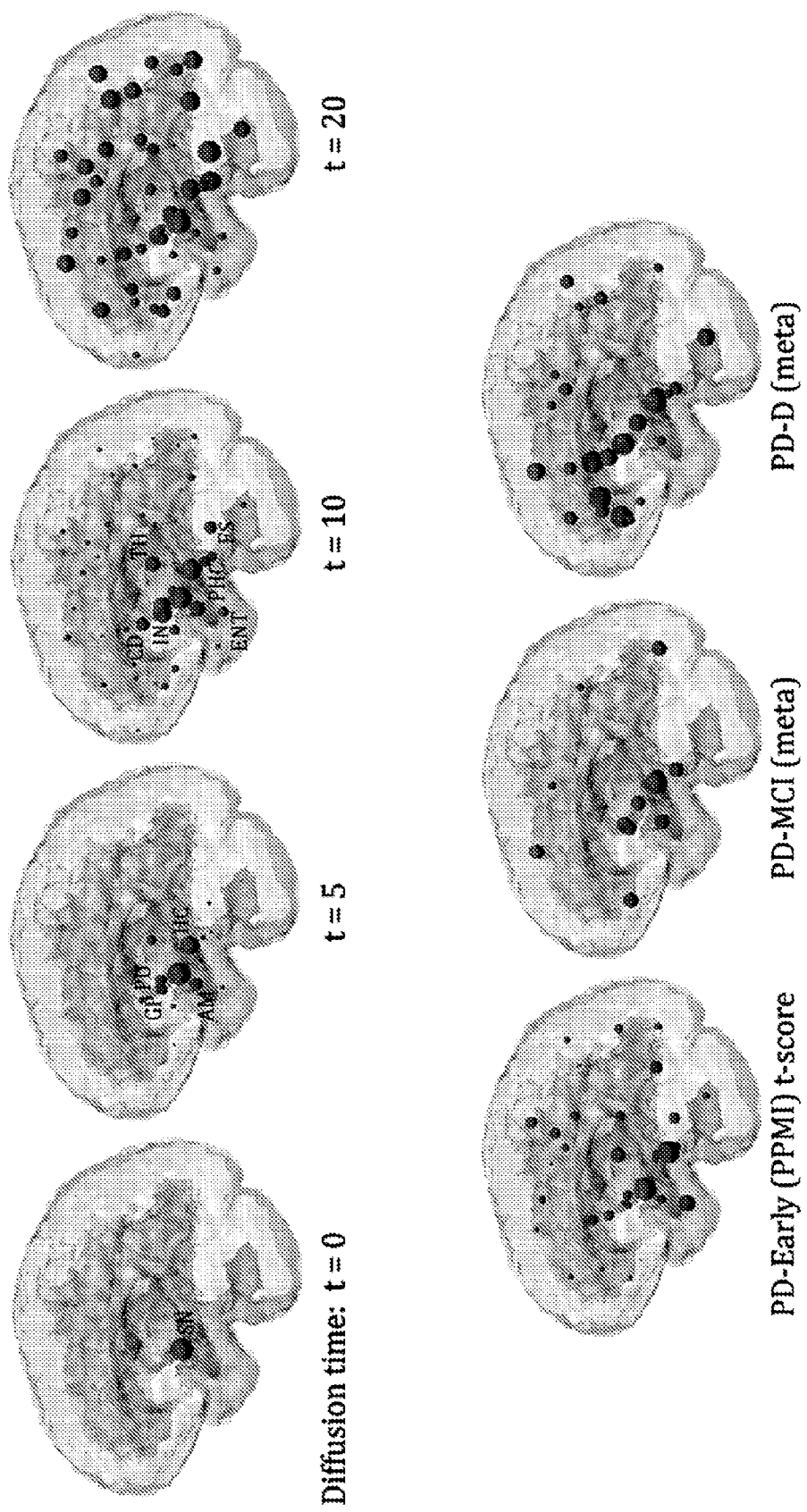
FIG. 13 depicts models of diffusion seeded from the Substantia Nigra in comparison to models of Parkinson's disease atrophy in accordance with an illustrative embodiment.

Parkinson's Disease:

Network diffusion modeling using 70 healthy connectomes was applied to 86-region Freesurfer volumetrics of Parkinson Progression Marker Initiative data (Table 1). FIG. 13 shows network diffusion process seeded at SN (t=0) first implicates basal ganglia and hippocampus, then thalamic, temporal and insular regions, eventually spreading to the cortex. This progression matches quite closely the archetypical sequencing in PD, as verified from Freesurfer of PPMI cohort as well as a meta-analysis of PD atrophy data (bottom).

TABLE 1

Demographic and clinical details of PPMI cohort. MoCA = Montreal Cognitive Assessment, UPDRS = Uniform PD Rating Score

|    | Male | Female | Age (mean ± std) | MoCA | UPDRS |
| --- | --- | --- | --- | --- | --- |
| HC | 30 | 11 | 57.9 ± 11.8 | 28.4 ± 1.2 | 6.0 ± 3.0 |
| PD | 41 | 19 | 61.1 ± 9.1 | 27.7 ± 2.1 | 37.4 ± 13.9 |

Although our results are validated on dementias like Alzheimer's and fronto-temporal dementia, this invention can be applied to any neurodegenerative disease in the brain, including but not limited to: Parkinson's disease, cortico-basal syndrome, PNFA, semantic dementia, ALS, dementia with Lewy bodies, vascular dementia, etc. Non-degenerative diseases like epilepsy and Multiple Sclerosis are also applicable, since they also exhibit archetypical patterns of disease spread within the brain in a manner consistent with trans-neuronal or trans-regional transmission of disease. We note here that this invention does not require specifically a prion-like trans-neuronal transmission, only that the disease spread be enacted in a deterministic way on the brain's connectivity network. Additionally, the method is useful in any CNS disease or condition involving brain atrophy or damage, including traumatic brain injury, psychiatric diseases including but not limited to depression, bipolar disorder, and schizophrenia, and dementias due to toxicity, such as chronic alcoholism.

Application of the Network Diffusion Model to Capture the Spread of Atrophy in Epilepsy Although epilepsy is not a neurodegenerative disease, it is a good candidate for network diffusion modeling, specifically the use of a diffusion kernel for predicting the pattern of atrophy that would develop in a patient's brain as a result of focal seizure onset or epileptogenic zone. This owes to the fact that a diffusive spread model enacted on the brain's anatomic connectivity network is able to capture the propagation of functional activity in the brain. This result was shown recently in our publication (Abdelnour, Voss and Raj, NeuroImage 2014). It was shown that the correlation strength between the anatomic connectivity amongst distant brain regions and their corresponding functional connectivity, measured via the covariance structure of resting-state functional BOLD activity, is significantly higher after the application of the diffusion kernel. Our results compared favorably to other available methods of obtaining the functional correlations from anatomic networks, for instance the neural mass models.

Therefore we sought to explore whether the propagation of hyper-activity in epilepsy, which is the root cause of neuronal damage and atrophy in epileptic subjects, can be modeled in the same manner. We hypothesized that this would indeed be the case, thus epileptogenic activity x0 originating at the seizure onset zone would cause an evolution of the hyperactive signal in connected regions, given by the same diffusive spread process as shown in Eq (3) for the spread of neurodegenerative pathology. We further hypothesized that that the resultant atrophy pattern would be given by the maximum hyperactivity experienced by a brain region.

We tested the ability of the network diffusion model to capture the cross-sectional pattern of atrophy in a well characterized and stereotyped group of epileptics, called temporal lobe epilepsy with mesial temporal epilepsy (TLS-MTS). We also applied our model to TLE subjects with no visible atrophy on MRI (LTE-no). The results of this exercise are described below.

Since the seizure onset zone is not generally or accurately known in individuals, we seeded each brain region and applied the diffusion kernel to the seed configuration. We computed the correlation of the model prediction with measured regional atrophy pattern of the group average of all subjects within each disease group. The region whose seeding produced the highest correlation with measured group atrophy was considered to be the putative seizure onset region of the group. These results are illustrated in FIG. 19 for TLE-MTS and FIG. 20 for TLE-no group. The visual and statistical resemblance between measured atrophy patterns and those predicted by the network diffusion model is strong. Using the methods and tools disclosed herein, future predictions of epileptic atrophy may be predicted.

Figure 21:
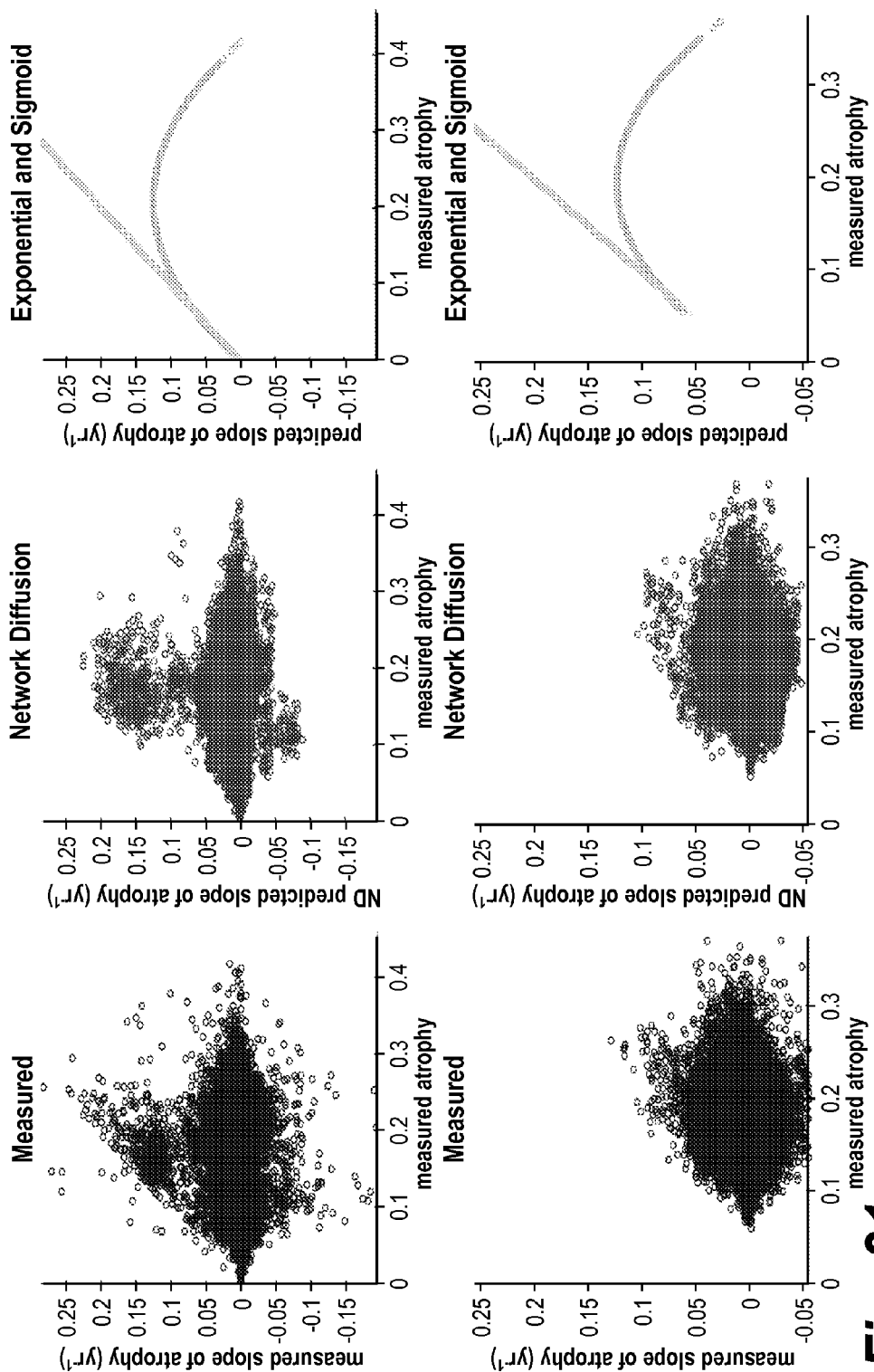
FIG. 21 depicts plots of measured atrophy and atrophy predicted by sigmoid, exponential and network diffusion models.

Testing the Regionally Varying Relationship Between Atrophy and its Rate of Change First, the observed relationship between atrophy and its rate of change of subjects in the ADNI database was established. For each parcellated structure these two numbers were calculated, and plotted as a scatter plot in FIG. 21 (left), where x-axis represents baseline atrophy and y-axis the slope of atrophy over the duration of longitudinal follow up. Thus, there is one dot per region of each subject (blue). It is clearly observed that the atrophy-slope relationship is complex, and different for different regions and subjects. In particular, no single straight line or curve can capture this relationship. The exponential model is represented by the straight line (green) and the sigmoid by the parabola (cyan) in the rightmost panel—see the theory section for an explanation. Clearly, the complex relationship between atrophy and its rate of change is influenced by noise, measurement artifacts, and while both the straight line and parabola capture some portions of the data, overall, these localized relationships do not fully fit measurements. In contrast, the prediction of the network diffusion model, shown in red in the middle panel, appears to successfully cover the atrophy-slope plane.

Figure 22:
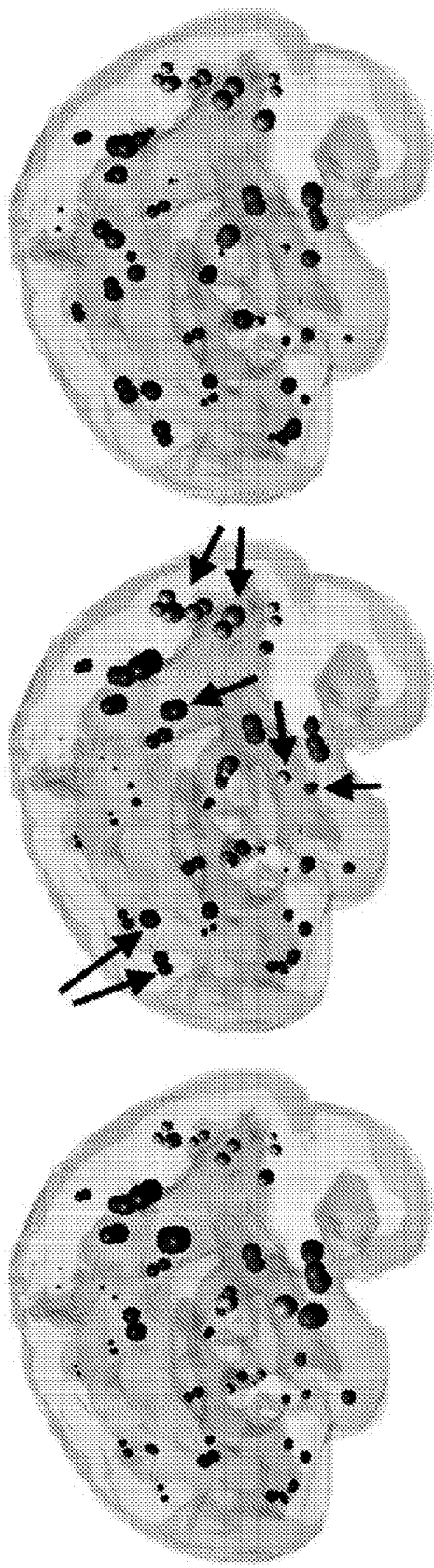
FIG. 22 depicts "glass brain" illustrations of the relationship between regional disease pattern and its rate of change.

In FIG. 22 we show this relationship more intuitively, as a surface rendering of the regional variation of baseline FDG-derived regional hypometabolism (left), its rate of change evaluated at each region (middle), and the network diffusion model-predicted rate of change (right). The statistic being plotted is the group t-statistic of the entire ADNI patient cohort (MCI+AD). The baseline FDG hypometabolism atrophy versus its change bear a complex and non-localized relationship, which is substantially captured by the model (right). While there is general agreement between baseline and change in temporoparietal regions, which are classically vulnerable to AD, the baseline pattern is not a good predictor of change in frontal and occipital regions. Black arrows point to specific structures that are discordant, including mesial temporal, frontal and occipital structures. In each of these structures, the network diffusion model provides a far better predictor of change of atrophy.

Figure 23:
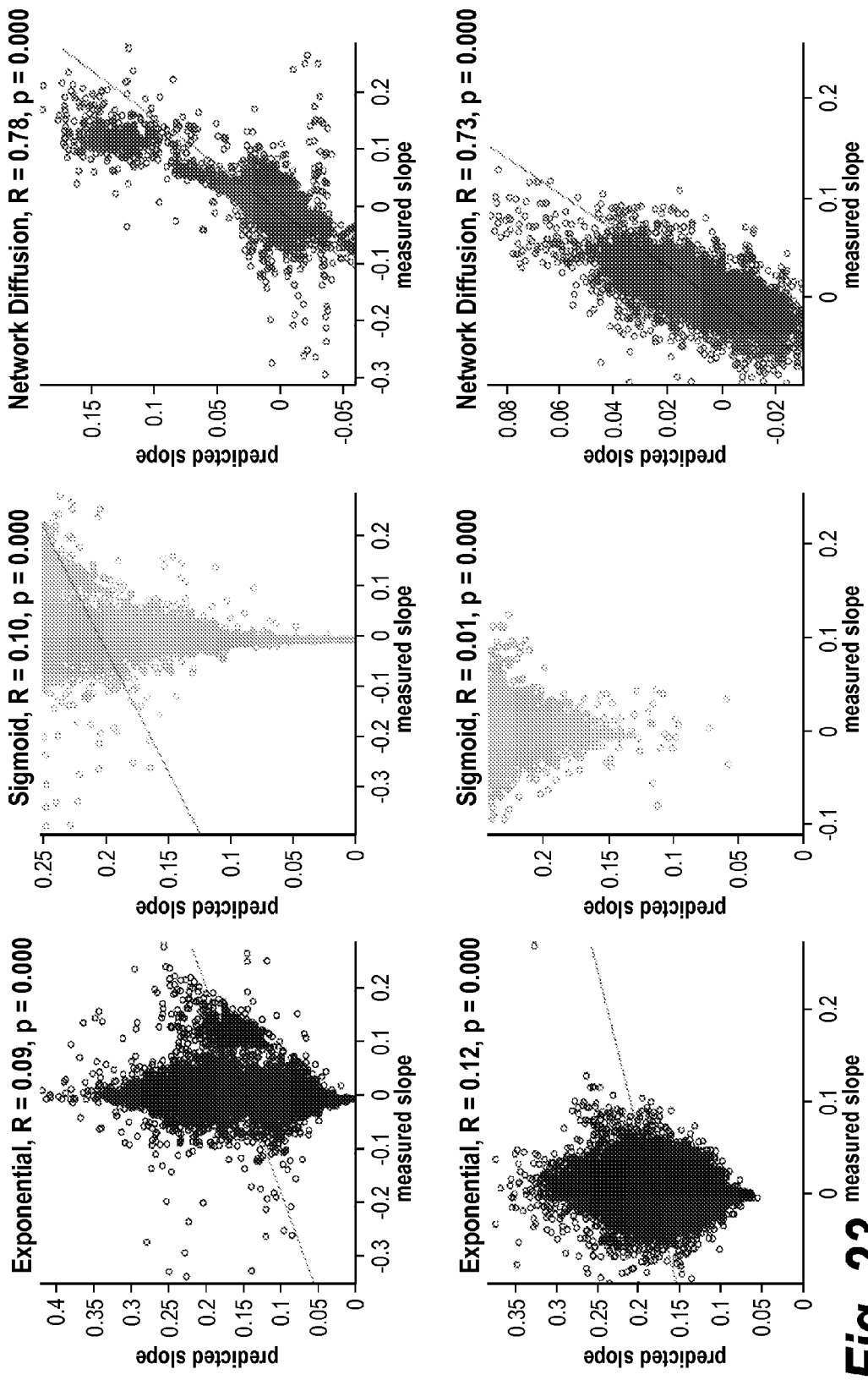
FIG. 23 depicts correlation between the measured and predicted atrophy slope for three groups for subjects: MCI converters, MCI-non-converters, and AD.

Next we demonstrate the accuracy of the model in predicting the regional rate of change of atrophy from baseline atrophy. FIG. 23 shows a correlation between the measured and predicted atrophy slope for three groups for subjects: MCI converters, MCI-non-converters, and AD. The correlation statistics shown in Table 2 indicates that the ND model is the only one that is able to capture the atrophy/slope relationship. The data depicted in Table 2 are examples of reference standards that may be used for diagnosis.

TABLE 2

Summary of correlation statistics between measured rate of atrophy/hypometabolism and predicted rate using various models

| Dataset | Exponentia l model, R | Sigmoid model, R | Network diffusion model, R |
|---|---|---|---|
| MCI + AD atrophy | 0.09 | 0.10 | 0.78 |
| MCI + AD FDG | 0.12 | −0.01 | 0.73 |

Predicting Future Patterns of Atrophy and Hypometabolism

Figure 24:
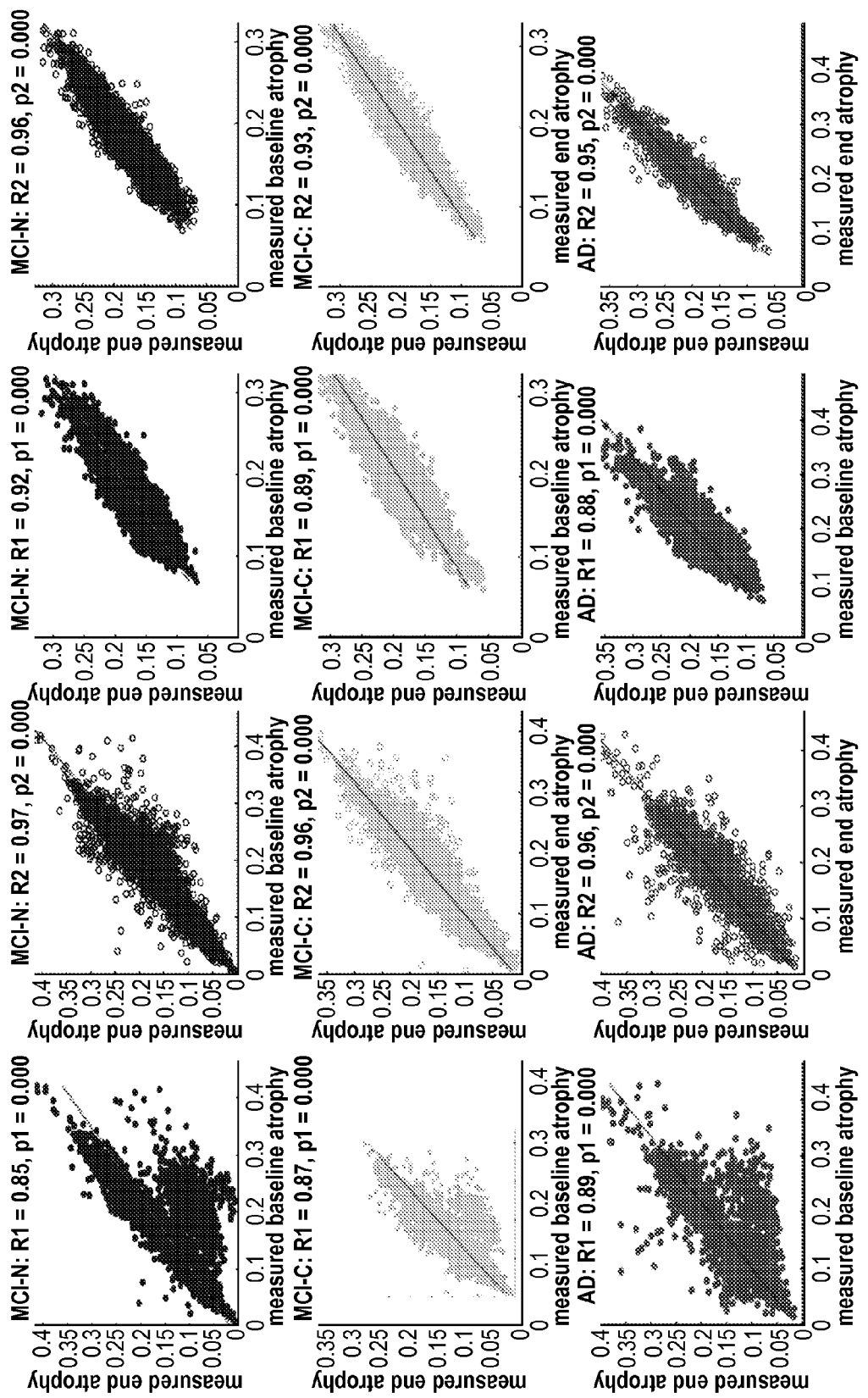
FIG. 24 depicts scatter plots displaying correlation between predicted and measured atrophy in different disease groups.

This is the key application of the proposed model, and validation of the predictive power of the network diffusion model is shown in FIG. 24. Each point corresponds to a single region in a single subject. The leftmost columns pertain to MRI-derived atrophy data and the rightmost columns to FDG-PET-derived hypometabolism data. The ADNI cohort is stratified by diagnosis: MCI-nonconverters (top row), MCI-converters (middle row) and AD (bottom row). Measured regional statistics already exhibit a strong and significant relationship between baseline regional atrophy and atrophy at end of study (1st and 3rd columns). This is to be expected, since the disease is not likely to progress drastically within the narrow ADNI longitudinal time window. Correlation strength is generally higher for FDG-derived data than for MRI-derived atrophy, this is expected given lower noise in FDG-PET images and fewer volumetric processing steps and consequently lower risk of processing artifacts. Interestingly, a significant subset of regional atrophy data appears to stray from the diagonal (1st column), implying that localized and linear relationships are not sufficient to capture the full dynamics of the disease.

The correlation strength is significantly improved in all cases by adding the network diffusion model. All disease subtypes, including MCI-nonconverters (top row) show significant improvement when acted upon by the model. The "off-diagonal" regions seen in measured data were successfully brought back onto the diagonal by the network diffusion model. Consequently, the R values denoting strength of Pearson correlation are greatly improved in all disease subtypes and imaging modalities; these statistics are shown in Table 3. Such statisctical analysis is an example of comparing output products to reference standards. Fisher's R to z transform, also shown in Table 2, denotes a highly significant improvement in correlation strength, indicating that the model is adding strong predictive power that cannot be explained by the baseline data alone. The quantum of the improvement is better appreciated by how much the model reduces unexplained variance. For instance, the measured MCI-converter atrophy data has an unexplained variance (1-R2) of 0.24, which has been reduced to 0.08 by the model. This constitutes a net improvement of 300%.

TABLE 3

Summary of correlation statistics between baseline and end of study regional statistics—atrophy from MRI and hypometabolism from FDG-PET

| Dataset | Stats (measured) | Stats (model) | Unexplained variance (measured) | Unexplained variance (model) | Significance of Fisher's R-z |
|---|---|---|---|---|---|
| MCI-N atrophy | 0.85 | 0.97 | 0.28 | 0.059 | ** |
| MCI-C atrophy | 0.87 | 0.96 | 0.24 | 0.078 | ** |
| AD atrophy | 0.89 | 0.96 | 0.21 | 0.078 | ** |
| MCI-N FDG | 0.92 | 0.96 | 0.15 | 0.078 | * |
| MCI-C FDG | 0.89 | 0.93 | 0.21 | 0.14 | * |
| AD FDG | 0.88 | 0.95 | 0.23 | 0.10 | ** |

Example Future Predictions of Atrophy and Hypometabolism

The results were obtained from baseline ADNI data and validated against longitudinal available time points, varying from 2 to 4 years. The disease is relatively stable and linear in this time window, which is quite narrow compared to the course of the disease. One of the most clinically relevant applications of the model is that it ought to be useful in predicting atrophy patterns well into the future, starting from baseline. In this section we provide some visually illustrated examples from the ADNI cohort, and demonstrate that the predictions are as expected by both theory and common neurological practice. These far-future predictions do not (as of now) have empirical confirmation, since the ADNI series does not extent that far, but they provide an important intuitive characterization of the model. These results, in FIGS. 25-27, contain 6 examples of MRI-derived atrophy maps, on all 3 diagnosis categories. Although it is not possible to show each case, these examples should be considered as representative of the entire ADNI cohort. The effect sizes, denoted by spheres placed at each region's center of mass, are scaled across all subjects, such that their size should be comparable across subjects and diagnosis. However, we note that despite careful control in the ADNI cohort of inter-subject variability, systematic differences in MRI-derived volumetrics and cortical thickness were observed, potentially making inter-subject comparison sometimes difficult to apply. FDG-PET-derived hypometabolism maps are equally amenable to the proposed model; however, the results are similar to MRI atrophy shown below; hence FDG results are suppressed.

FIG. 25 shows "glass brain" illustrations of two example MCI non-converters from the ADNI cohort. The spheres are proportional to effect size, and color-coded by lobe—frontal=blue, parietal=purple, occipital=green, temporal=red, subcortical=yellow. Regional MRI-derived atrophy (logistic transform of regional z-score with respect to ADNI controls) at baseline with respect to ADNI healthy controls are depicted, after logistic transform to convert z-scores to positive atrophy values between 0 and 1. The next two panels show the network diffusion model prediction based on this baseline atrophy pattern, extrapolated to 5 years and ten years out. The timescale is not known a priori in the ND model; here it was estimated by empirical fitting to longitudinal data. The top case displays classic MCI topography with hippocampal involvement. As the extrapolations indicate, subsequent patterns do not significantly spread however, and although various cortical regions are affected, there is no prominent temporal involvement. This prognosis is in agreement with the subject's current diagnostic assessment of MCI-nonconverter. The example in the bottom panel presents an interesting variant of the non-converter case. Here, there is prominent atrophy at baseline, affecting widespread structures, especially in the frontal cortex. However, extrapolated atrophy patterns stay within the frontal areas, and subsequently spread to parietal, but not temporal, regions. This prognosis is consistent with the subject's diagnostic assessment as MCI-nonconverter; however, we would expect future impairment of non-memory cognitive domains, for example attention and behavior.

FIG. 26 shows two examples of MCI-converters, one of which (bottom row) exhibits the classic AD pattern of progression within and outwards from the temporal lobe. Baseline atrophy is overall mild, but the extrapolated patterns show the classic progression from MCI to AD. Specifically, the recruitment of temporal and subcortical regions, the classic anatomic substrate of memory-related cognitive dysfunction, increases prominently. The top case also exhibits prominent and early temporal involvement, but future predictions are stronger in frontal and parietal regions. This case is consistent with current diagnosis of MCI-converter, but worsening frontoparietal atrophy may be expected. FIG. 27 shows two representative AD examples, whose classic temporal-dominant atrophy pattern does not so much change character over extrapolated timescales as progressively grows more severe.

Subjects:

The subject may be any animal, including a human. human and non-human animals. Non-human animals includes all vertebrates, e.g., mammals and non-mammals, such as non-human primates, sheep, dogs, cats, cows, horses, chickens, amphibians, and reptiles, although mammals are preferred, such as non-human primates, sheep, dogs, cats, cows and horses. The subject may also be livestock such as, cattle, swine, sheep, poultry, and horses, or pets, such as dogs and cats.

Preferred subjects include human subjects suffering from or at risk for the disease or condition. The subject is generally diagnosed with the condition of the subject invention by skilled artisans, such as a medical practitioner.

The methods of the invention described herein can be employed for subjects of any species, gender, age, ethnic population, or genotype. Accordingly, the term subject includes males and females, and it includes elderly, elderly-to-adult transition age subjects adults, adult-to-pre-adult transition age subjects, and pre-adults, including adolescents, children, and infants.

Examples of human ethnic populations include Caucasians, Asians, Hispanics, Africans, African Americans, Native Americans, Semites, and Pacific Islanders. The methods of the invention may be more appropriate for some ethnic populations such as Caucasians, especially northern European populations, as well as Asian populations.

The term subject includes a subject of any body height, body weight, or any organ or body part size or shape.

Applications in Differential Diagnosis and Automatic Disease Classification

The network diffusion model's eigen-modes form an effective and parsimonious basis on which atrophy data can be projected for differential diagnosis. In FIG. 11 we demonstrated the role of the persistent modes as biomarkers and as highly effective basis functions for dimensionality reduction, classification and automated differential diagnosis. Panel (a) shows the mean dot product between atrophy and the first 3 eigen-modes for each dementia group. The aged but cognitively normal group shows mixed presence of all three eigen-modes, whereas the other two disease groups show primary presence of the eigen-mode hypothesized to be associated with the disease. A one-to-one correspondence between dementias and eigen-modes is obvious—the normal aging group exhibits the highest contribution from the $1^{st}$ eigen-mode $u_1$, the AD group displays the highest contribution from $u_2$, and bvFTD from $u_3$. Panel (b) shows the scatter plot of the dot product in (a) for AD and bvFTD subjects, showing clear separation of the two groups after projection onto the eigen-modes. There is visually appreciable separation between the two groups, indicating that the eigen-modes are acting as an effective basis for dimensionality reduction and classification. Panel (c) shows the area under the Receiver Operator Characteristics (ROC) curve of 3-way classification at various dimensions of feature space, based on eigen-modes as well as PCA. This plot shows that the eigen-modes are doing at least as good a job of dimensionality reduction as the principal components analysis. It is noteworthy that PCA, which is conventionally the "optimum" reduced-space representation, does not produce better classification than eigen-modes. Since classifier accuracy depends on the number of basis vectors, in FIG. 11C we plot the area under the ROC curve as a function of the dimensionality of the feature space, for both eigen-modes and PCA. Clearly, eigen-modes appear to do a better job of dimensionality reduction and diagnostic classification than PCA. Note that some false positives for both classifiers are expected due to clinical mis-diagnosis. Panel (d): Receiver Operator Characteristics (ROC) curve of both classifiers, using 4 features each. The blue curve corresponds to classification using the first 4 eigen-modes of network diffusion, while the red curve corresponds to classification using the first 4 principle components of the atrophy z-scores. Clearly, the eigen-modes provide better classifiability in terms of area under the ROC curve.

In a similar manner, the network diffusion eigen-modes can be used as projectors of regional disease patterns in other diseases mentioned above. This allows us to distill these large and complex datasets into 2 or 3 quantities, which provides neurologically meaningful but quantitative assessment of the overall disease pattern, and allows a neurologist to provide a better diagnosis of the disease compared to visual inspection alone. Instead of dealing with high-dimensional and complex whole brain atrophy patterns, neuroradiologists can simply look at the relative contribution of the first 3-4 eigen-modes in any person's brain, and treat them as clinical biomarkers. This is especially advantageous for heterogeneous and mixed dementia, which are poorly served by classically described clinical phenotypes.

A concrete example: there are many cases of dementia secondary to other disorders like Parkinson's or vascular stress. The regional atrophy patterns are by themselves not very useful in distinguishing between classic atrophy types in these cases of mixed clinical presentation due to their large size and complexity. By projecting them onto the first few eigen-modes, all that data reduce to 2 or 3 numbers, which then inform the neurologist as to whether the spatial patterns are most consistent with Alzheimer's fronto-temporal or yet another dementia type. If more than one dementia type is present, these projections provide the relative contribution of each type.

Prognostic Biomarker in Clinical Trials

Large clinical trials of interventions, including but not limited to drugs, behavioral recommendations, physical therapy, psychology therapy, and medical devices, in CNS diseases and conditions, require accurate and quantitative biomarkers of the extent and severity of atrophy and other injuries caused by the disease or condition. Imaging biomarkers are critical in these trials, because they provide this information. However, current imaging biomarkers are not fully quantitative, and they provide a lot of spatial information without the ability to extract usable quantitative information of relevance. For instance, the trial operator would like to know whether the subjects' atrophy is slowing down, reversing, or not. And if so, what spatial patterns are being shown?

This invention can be applied as a quantitative biomarker in clinical trials in two ways. First, by compressing the spatial information into 2 or 3 eigen-mode projections (described above), the progress of the trial cohort can be measured more effectively and succinctly. Second, the ability to predict future patterns of disease in a patient (see below) can enable a more accurate longitudinal assessment of the progress the trial cohort is making and of the efficacy of the intervention being tested.

Prediction of Future Disease Patterns from Baseline Imaging

We also provide a system and method which can take a baseline medical image of a subject's brain, extract needed information from it automatically, apply the network diffusion model to this information, and predict the future states of neurodegeneration and its spatial patterns in the subject's brain. We showed above how to do this using the network diffusion model, and presented validating evidence from a large pubic database of dementia subjects. We also showed that the model's dynamics correctly capture the spread of other prionopathies like Parkinson's, once the model is seeded at the substantia nigra.

This is the first system and method for predicting future spatial patterns of disease in an individual patient's brain. The system integrates information regarding the functional role of each impacted region and outputs an ordered list of likely functional deficits (motor, cognitive, memory, etc.) that the subject can expect to encounter. In an embodiment, the system can also output a list of the most affected regions and the pathways connecting them. A neurologist treating the subject can use the output to design a treatment regimen to address those deficits and/or selectively target those regions, for example and without limitation, using transcranial magnetic stimulation (TMS) or deep brain stimulation (DBS) via implanted electrodes.

Early Detection of Dementia

A related application is in the assessment of early disease. Many dementias, like AD, have a prodromal stage (MCI) where the symptoms of dementia first appear, but without the level of systemic involvement which would lead to a clinical diagnosis of dementia. This stage is thought of as a precursor, however, with current technology there is no certainty that the subject displaying MCI symptoms will in fact progress to full blown Alzheimer's. Current alternatives rely on pattern recognition of regional atrophy patterns and typically automatically classify the regional patterns of a given subject into two or three groups—AD, MCI-converters and MCI-nonconverters. Although the classification algorithms are suitable and well tested for this purpose, the quality of these classifiers depends critically on an accurate assessment of regional damage. Unfortunately, in early and prodromal disease these patterns are not established, and the poor sensitivity of current imaging methods are insufficient to accurately characterize these patterns in early disease. The current invention can be used to provide accurate early assessment of these cases as follows. By "playing out" the deterministic network model and predicting future patterns of disease (see above), the system shows whether the future patterns of an MCI subject are consistent with full Alzheimer's or another dementia subtype. Using our system, the neurologist can assess whether currently detectable regions showing appreciable involvement are consistent with a future which leads to dementia. This provides a stronger and richer level of information and correctly predicts whether a subject is a converter or not.

Systems

The above-described methods can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may include a memory, coupled to one or more processing units (also referred to herein simply as "processors"), one or more communication interfaces, one or more display units, and one or more user input devices. The memory may include any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The scope of the present disclosure is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

EXAMPLES

The present description is further illustrated by the following examples, which should not be construed as limiting in any way. The contents of all cited references (including literature references, issued patents, published patent applications as cited throughout this application) are hereby expressly incorporated by reference.

Example

Correlation with Measured Atrophy Patterns

The t-statistic of parcellated diseased versus young healthy volumes was correlated against each hypothesized eigen-mode and plotted in FIG. 10. In addition we show correlations involving the mean young healthy ROI volume data $t_{vol}$, in order to test our supposition that the $1^{st}$ eigen-mode $u_1$ simply reflects the size of each region. Pearson's correlation coefficient and the p-value of a one-sided t-test are also given, and indicate statistically significant correlation at the level of e<C.OS for the diagonal plots, but not for the "cross" plots. The sole discordant result is the high correlation observed between $u_2$ and bvFTD, which is again attributable to the unusually high temporal involvement seen in our bvFTD subjects. The strong correlation between normal aging and the $1^{st}$ eigen-mode (FIG. 16) supports the hypothesis that the latter corresponds to normal aging. While the ROI-wise correlation is highly significant and the match is very good in proximate neighborhoods, small discrepancies are apparent (FIGS. 6-9) and preclude complete correspondence between measured and predicted atrophy. These discrepancies might be attributed to methodological limitations, the small sample size, clinical/pathological heterogeneity and possible misdiagnosis of dementia subjects.

To overcome the multiple comparisons problem, we assessed a separate measure of statistical significance. As in (Seeley et al. 2009), we separate the measured atrophy pattern of each disease state into two groups of ROIs—(a) atrophied (t-statistic>1), and (b) the remaining ROIs. The atrophied ROIs coincided with well-known regions affected in each disease. (For the young healthy subjects' ROI volume data $t_{vol}$ the set (a) consists simply of the largest regions by volume.) Then we test whether the predicted atrophy pattern of nodes in these two sets (a) and (b) are statistically different via a one-tailed t-test, and report the p-values in FIG. 10 under p2. Thus, two separate measures of significance are used to substantiate our main hypothesis—that there is a one-to-one correspondence between dementias and network eigen-modes.

Example

Diagnostic Power of Persistent Modes

Figure 11B:
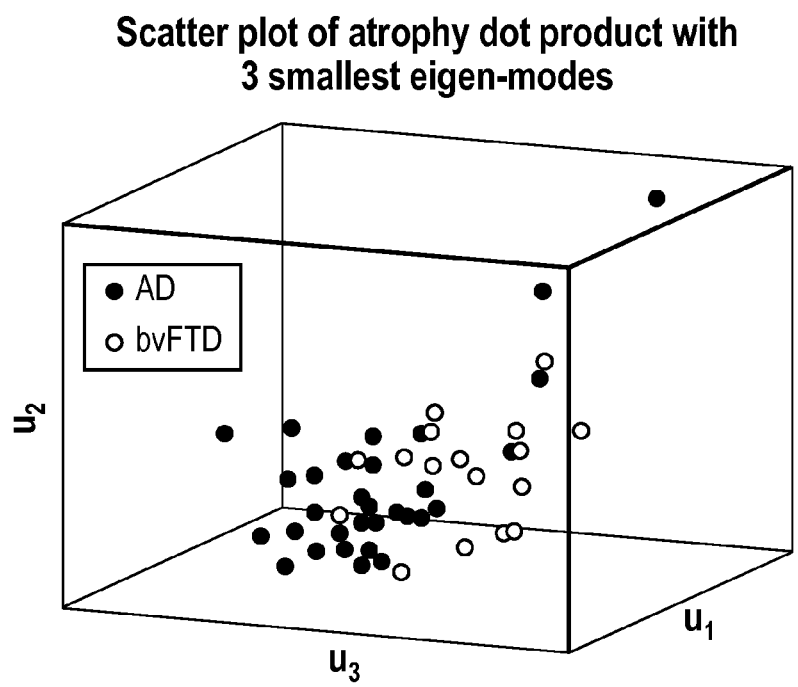
FIG. 11B depicts a scatter plot of the dot product in FIG. 9A for AD and bvFTD subjects in accordance with an illustrative embodiment.
Figure 11C:
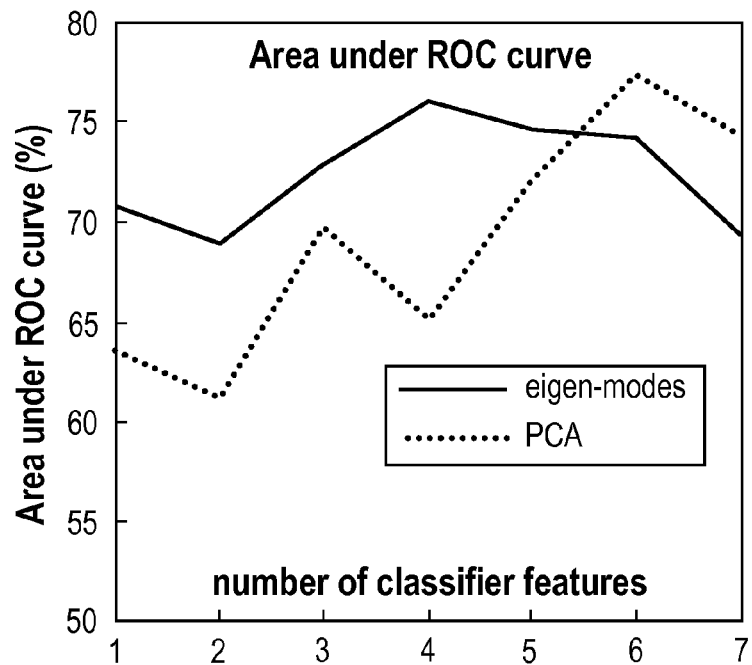
FIG. 11C depicts a plot of the area under the Receiver Operator Characteristics (ROC) curve of 3-way classification at various dimensions of feature space, based on eigen-modes as well as PCA in accordance with an illustrative embodiment.
Figure 11D:
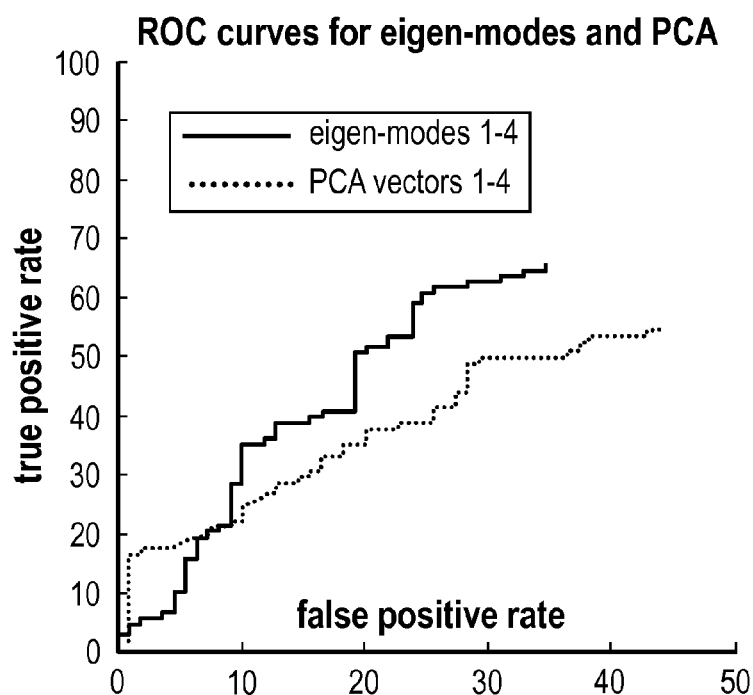
FIG. 11D depicts a plot of the Receiver Operator Characteristics (ROC) curve of both classifiers, using 4 features each in accordance with an illustrative embodiment.

We now show that persistent modes form an effective and parsimonious basis on which atrophy data can be projected for differential diagnosis. FIG. 11A shows the mean within each dementia group of the relative strength of the dot product d(k,n), which is a projection of the atrophy pattern of k-th subject onto the n-th eigen-mode. The normal aging group exhibits the highest contribution from the $1^{st}$ eigen-mode $u_1$, the AD group displays the highest contribution from $u_2$, and bvFTD from $u_3$. This further corroborates our earlier claim of one-to-one correspondence between dementias and eigen-modes. The bvFTD group shows higher than expected contribution from $u_2$, which we again attribute to heterogeneity in our bvFTD cohort. FIG. 11B is a scatter plot of d(k,n=1,2,3) for AD and bvFTD subjects. There is visually appreciable separation between the two groups, indicating that the eigen-modes are acting as an effective basis for dimensionality reduction and classification. The classification ROC curve using projections onto the 4 smallest eigen-modes is shown in FIG. 11D, along with the ROC of a direct dimensionality reduction using principal components analysis (PCA). It is noteworthy that PCA, which is conventionally the "optimum" reduced-space representation, does not produce better classification than eigen-modes. Since classifier accuracy depends on the number of basis vectors, in FIG. 11C we plot the area under the ROC curve as a function of the dimensionality of the feature space, for both eigen-modes and PCA. Clearly, eigen-modes appear to do a better job of dimensionality reduction and diagnostic classification than PCA. As the number of dimensions increase, the relative performance of both bases must converge, and in fact both begin to perform poorly due to overfitting of noise. Note the high false positive rates for both classifiers—since there is no "ground truth" in the clinical diagnosis data, a certain amount of misclassification is both expected and unavoidable.

Example

Prediction of Population-Wide Prevalence Rates

Figures 12A, 12B:
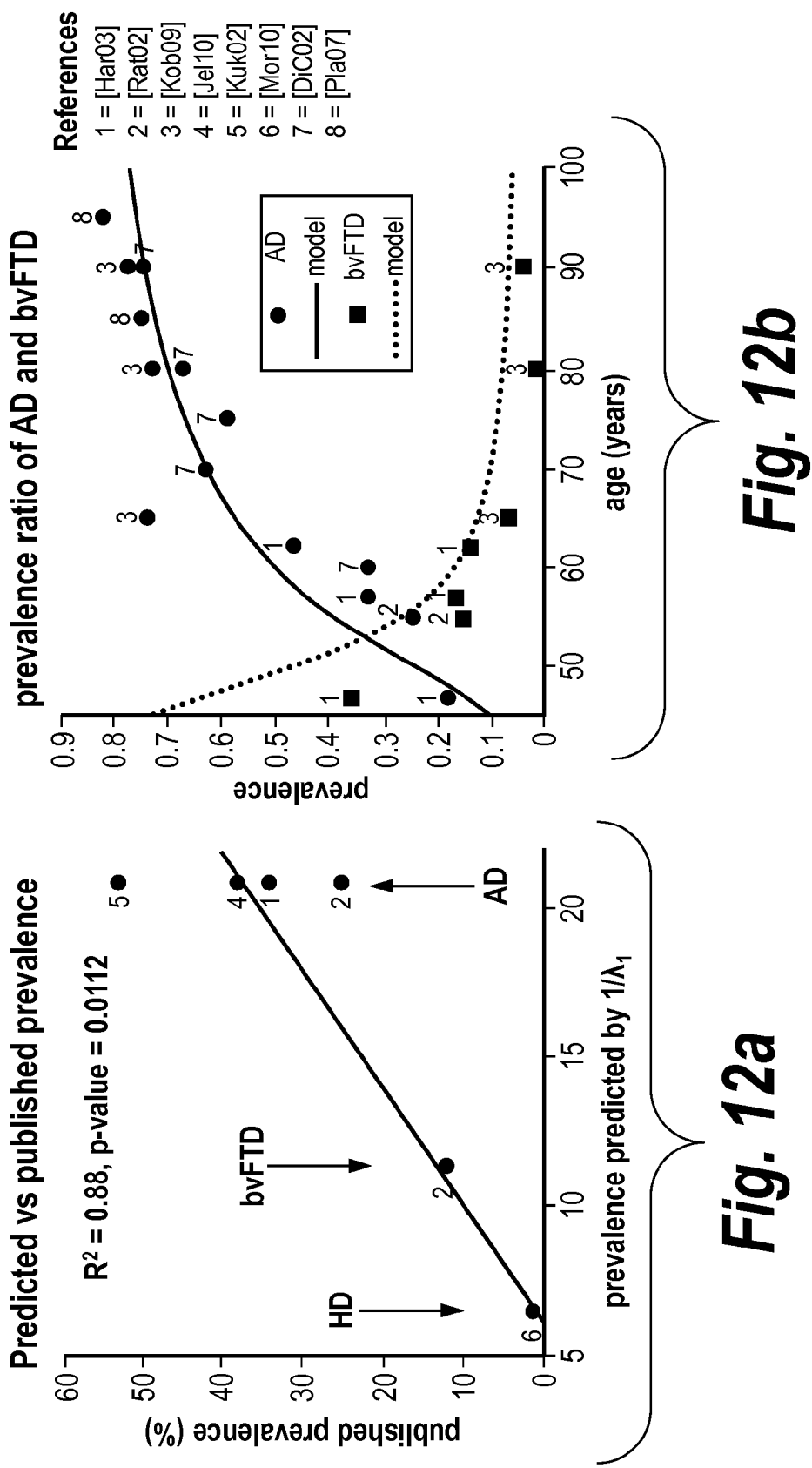
FIG. 12A depicts a plot of the predicted versus published the prevalence rate of various dementias as percentage of all dementias in accordance with an illustrative embodiment.
FIG. 12B depicts a plot of the published and predicted relative prevalence of AD versus bvFTD as a function of age in accordance with an illustrative embodiment.

FIG. 12A shows the correlation between $$\frac{1}{\lambda_i}$$

and published prevalence rates of 3 major degenerative disorders. Predicted order of prevalence matches published data: AD (highest prevalence), then bvFTD, then Huntington's (which was included as an example of a rare degenerative disorder with similarities with the $4^{th}$ eigen-mode). FIG. 12B shows that the prevalence of AD and bvFTD as a function of age generally agrees with the curves predicted by our model at almost all ages. Since theoretical prevalence relies on the unknown disease progression rate β and the age of onset (i.e. when to consider t=0), we optimized them for best fit with published data. This optimization is justified because the unknown parameters are not arbitrary but fully natural physiological parameters. Since there is no agreement in the published literature about their values, we must by necessity find them experimentally by fitting to prevalence data. The model correctly predicts that early prevalence of bvFTD should be higher than AD, equaling AD at around 60 years age—mirroring recent prevalence studies of AD and bvFTD under 65 years. The model also correctly predicts that with age the relative prevalence of AD vs bvFTD should increase (Boxer et al.). While predicted bvFTD prevalence is a bit higher than published prevalence, we note that FTD is now considered highly under-diagnosed. Considering the highly variable and cohort-dependent nature of known prevalence studies, the strong agreement provides further support to the model.

Example

Bootstrap Analysis of Variability Among Subjects

Although our hypotheses were validated using group means of atrophy and connectivity, individual subjects are known to vary greatly in both. Hence we must address the question of natural inter-subject variability. How sensitive are the presented results to the choice of particular subjects used in our study, given our moderate sample size? We performed a principled statistical analysis using Bootstrap Sampling with replacement which simulates the variability within a sample group by resampling the group multiple times.

Our experimental results rely on MRI volumetric and connectivity data derived from 3 subjects groups—14 young healthy, 19 age-matched normals, 18 AD and 18 bvFTD subjects. Our results use group means to derive the putative healthy brain network, and we showed correlations of this network's eigen-modes with various atrophy maps which were all derived from group-wise t-statistics of ROI volumes. Although this approach is quite standard in the field and many publications have advocated similar approaches, there is still a question of inter-subject variability which must be addressed. We provided some answers to the issue of methodology-dependent variability in our results in FIG. 8, where an entirely different parcellation, voluming and atlasing method (FreeSurfer) was used, and showed that our conclusions are not significantly altered based on the choice of methodology. But what about natural variability between subjects, given that our groups don't have extremely large sample sizes? How sensitive are the presented results to the choice of particular subjects used in our study? How would the healthy network change if the composition of the young healthy group was different? How internally consistent are the atrophy maps of each disease group. Would the conclusions of our study change significantly if a different set of subjects was used?

In order to answer these questions in a principled manner, we now describe an approach based on Bootstrap Sampling, a well-known statistical resampling method. Bootstrap sampling involves drawing a large number of samples from the existing set of samples, but doing this independently for each sample, and allowing replacements—i.e. a single sample from the set may occur multiple times in any of the bootstrap samples. A histogram of any test statistic of interest using these bootstrap samples is then created. Using well-known principles, this histogram is then thought to reflect the natural variability one would expect from this sample. We employ this approach in our analysis of variability.

Figure 18A:
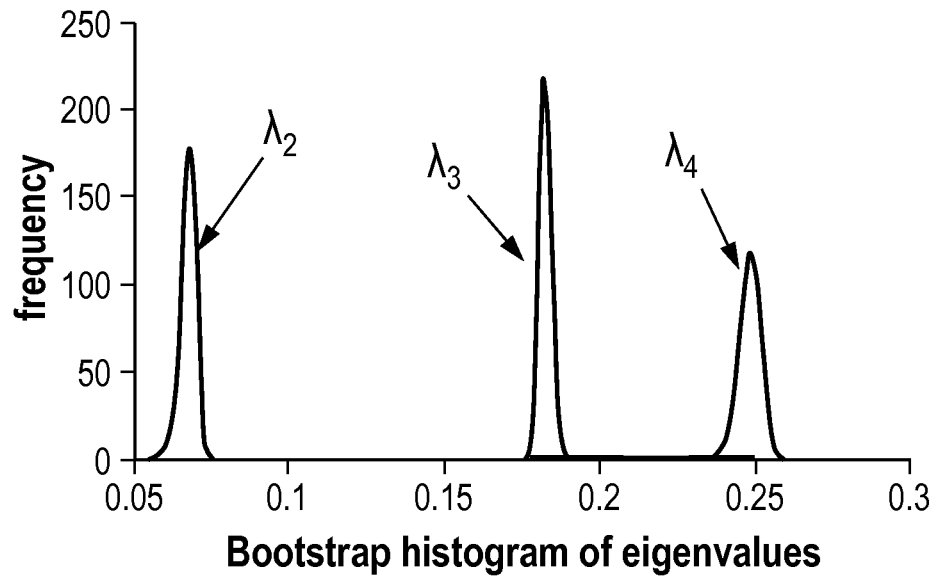
FIG. 18 depicts histograms of the bootstrap analysis of variability among subjects in accordance with an illustrative embodiment.

First we investigate the variability in the healthy network due to inter-subject variations. In this case, the test statistics are the smallest 3 eigen-values of the mean network's Laplacian. One thousand bootstrap samples with replacement of the 14 healthy connectivity matrices were evaluated for resulting changes in the eigenvalues of the Laplacian of the average network. The histogram of the smallest 3 non-zero eigenvalues are shown in FIG. 18A, and clearly indicate high consistency and reproducibility. The histogram was estimated using the non-parametric kernel smoothing density estimation method. Each eigen-value is distributed tightly around its mean value, and there is no bias. It may be concluded that our 14 young healthy subjects did not exhibit significant variability in terms of network eigenvalues, and therefore all our presented results that depend on eigenvalues (e.g. the atrophy rate and prevalence results) should be consistent and reproducible.

Next we investigate the variability of the eigen-modes. For illustration, we chose as the test statistic the projection (dot product) of the 2nd eigen-mode onto the Alzheimer's atrophy dataset $$s_{boot} = \frac{u_2 \cdot t_{AD}}{\|u_2\|\|t_{AD}\|}$$

Figure 18B:
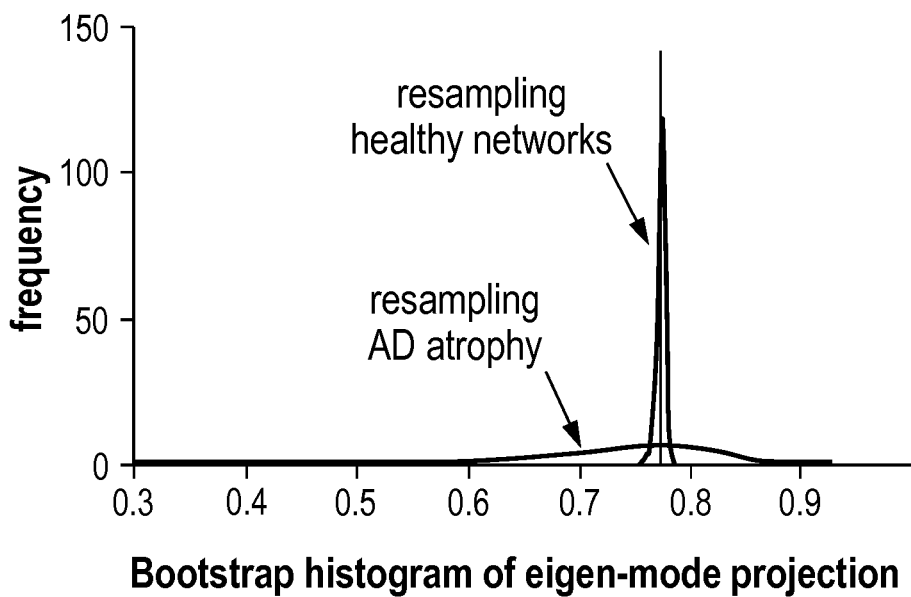

This is an important and informative statistic, because this paper's conclusions rely on there being a strong correlation between this eigen-mode and AD atrophy. Note however that for the purpose of this analysis, the eigen-mode could have been projected onto any arbitrary vector as long as it didn't change during the bootstrap resampling, because we are investigating the effect of variability only of the eigen-mode. The variability in this statistic should give a good indication of the effect of variability in our subjects. Again 1000 bootstrap samples were taken from the young healthy group, and mean connectivity network was obtained in each case. We found that the resulting 2nd eigen-mode, after projecting onto the AD atrophy t-statistic, produced a very consistent set of results. A histogram of the test statistic sboot is shown in FIG. 18B green curve, and it can be observed that a tight distribution results, which is centered around the projection resulting from the mean network eigen-mode projected onto the t-map of AD atrophy (orange vertical line).

Finally, we investigate the effect of variability in our disease groups. In this case, the boostrap test statistic sboot is the same as above, but the samples are now drawn from the variability in the AD atrophy group. When the bootstrap procedure was repeated for AD atrophy t-statistic, by sampling with replacement from the AD group, we found that the resultant t-statistic of atrophy was somewhat more variable. The histogram of sboot using this alternative bootstrap sampling is depicted by the red curve, and shows much greater variability than the previous result. However, we note that the histogram is still centered around, and has the highest probability at, the mean projection (orange line), implying that by taking the mean network and atrophy statistics from the available subjects we did not introduce any bias in our results. This bootstrap procedure was repeated for other projections involving bvFTD, etc., but the results are similar to FIG. 18, and are not shown here.

Detailed Description of the Development of a Novel Network Diffusion Model

We model dementia progression as a diffusion process on a hypothesized brain network g={V,E} whose nodes $v_i \in V$ represent the $i^{th}$ cortical or subcortical grey matter structure, and whose edges $e_{i,j} \in E$ represent white matter fiber pathways connecting structures i,j. Structures $v_i$ comes from parcellation of brain MRI, and connection strength $c_{i,j}$ is measured by fiber tractography (T. E. J. Behrens et al. 2007). Consider an isolated population of fibers from an affected (R2) to unaffected (R1) region. The number of diseased afferents from R2 to R1 is the product of the concentration $x_2$ of the disease factor and the inter-region connection strength $c_{1,2}$. Conversely, there is a reverse diffusion from R1 to R2 proportional to $x_1 c_{2,1}$. The total concentration of the disease factor in R1 will therefore increase by β ($x_2$−$x_1$)$c_{1,2}$ δt in a (short) instant δt, where β is the diffusivity constant controlling propagation speed. Assuming bidirectional pathways, this leads, in the limit δt→0 to the $1^{st}$ order differential equation:

$$\frac{dx_1}{dt} = \beta c_{1,2}(x_2 - x_1) \tag{1a}$$

A Random Walker Network Diffusion Model of Propagation.

Spectral graph theory provides us with an elegant generalization of eq. (1a) to the entire network. Suppose the disease factor at time t at each node in the network is represented by the vector x(t)={x(v,t), v∈V}. Then (1a) generalizes to the so-called "network heat equation"

$$\frac{dx(t)}{dt} = -\beta H x(t) \tag{2a}$$

where H is the well-known graph Laplacian, with $$H_{i,j} = \begin{cases} -c_{i,j} & \text{for } c_{i,j} \neq 0 \\ \sum_{i,j': e_{i,j'} \in \varepsilon} c_{i,j'} & \text{for } i = j \\ 0 & \text{otherwise} \end{cases} \tag{3a}$$

This is the graph-equivalent of the Laplacian diffusion operator $\Delta x \triangleq \nabla^2 x$. Since all brain regions are not the same size, we normalize each row and column of the Laplacian by their sums. Note that this model only depends on the long-range transmission of proteopathic carriers, and not on their local "leaking" via synapses and dendrites, which will be restricted to the local microenvironment of gray matter. Since our diffusion model uses relatively large, anatomically distinct structures as brain network nodes, the effect of localized transmission will be predominantly intra-node. Disregarding the large-scale network effects of local inter-node leaking, the network Laplacian H does not dependent on self-connectivity within a node.

We model cortical atrophy in region k to be the accumulation of the disease process in k, modeled as the integral $$\phi_k(t) = \int_0^t x_k(\tau) d\tau$$

On the whole brain this gives $\Phi(t) = \int_0^t x(\tau) d\tau$. From matrix algebra, eq. (1a) is satisfied by $$x(t) = e^{-\beta H t} x_0 \tag{4a}$$

where $x_0$ is the initial pattern of the disease process, on which the term $e^{-\beta H t}$ acts essentially as a spatial and temporal blurring operator. We therefore call $e^{-\beta H t}$ the diffusion kernel, and eq. (4) is interpreted as the impulse response function of the network.

Persistent Modes of Propagation.

The computation of eq. (4) is accomplished via the eigenvalue decomposition $H = U \Lambda U^\dagger$, where $U = [u_1 \ldots u_N]$, giving $$x(t) = U e^{-\Lambda \beta t} U^\dagger x_0 = \sum_{i=1}^N (e^{-\beta \lambda_i t} u_i^\dagger x_0) u_i \tag{5a}$$

Figure 14:
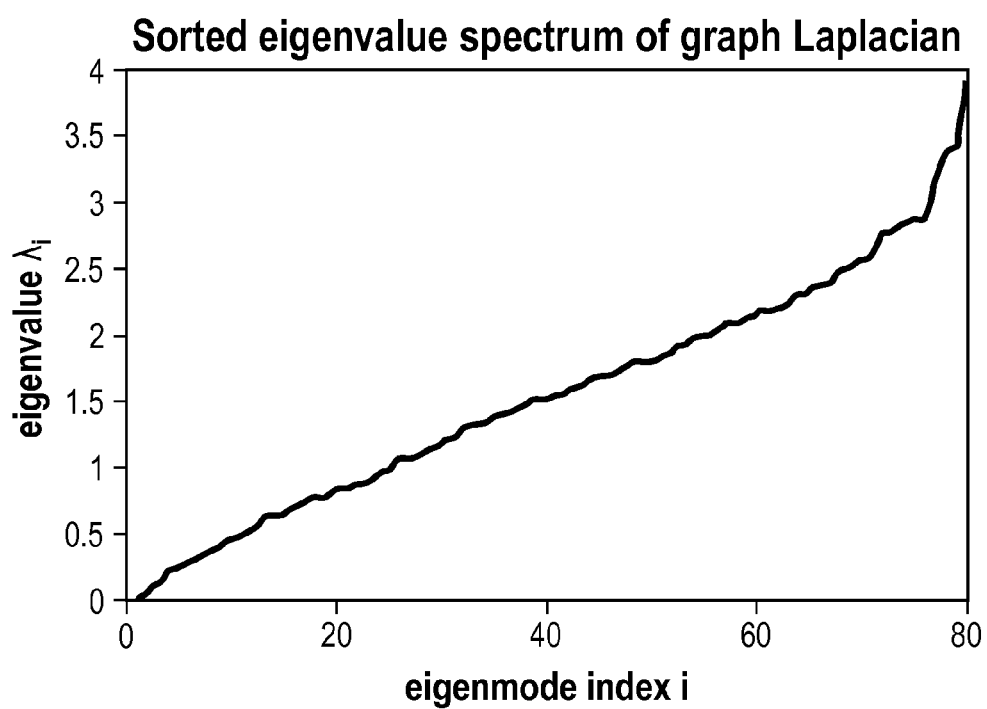
FIG. 14 depicts a plot of the spectrum of the eigen values of the young healthy brain network Laplacian matrix H in accordance with an illustrative embodiment.

The eigenvalues $\lambda_i$ of the Laplacian H are in the interval [0, 1], with a single 0 eigenvalue and a small number of near-zero eigenvalues (see FIG. 14). Most eigen-modes $u_i$ correspond to large eigenvalues that quickly decay due to exponentiation, leaving only the small eigen-modes, whose absolute values we denote by "persistent modes", to contribute (see FIG. 15A).

Dynamics.

Figure 15B:
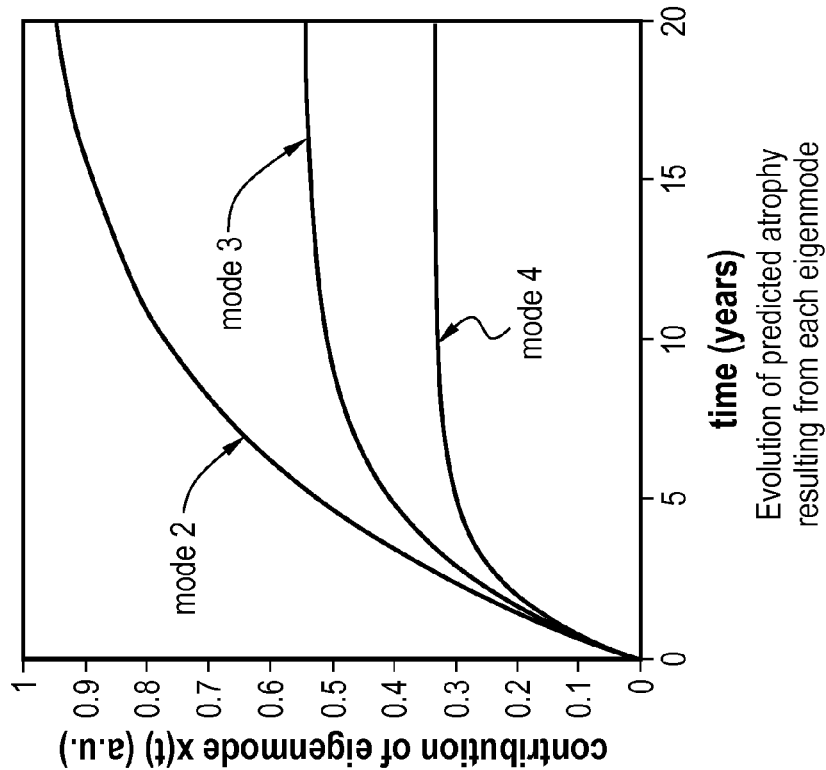
FIG. 15B depicts a plot of the resulting atrophy dynamics as a time integral of the eigen-modes shown in FIG. 13A in accordance with an illustrative embodiment.
Figure 15A:
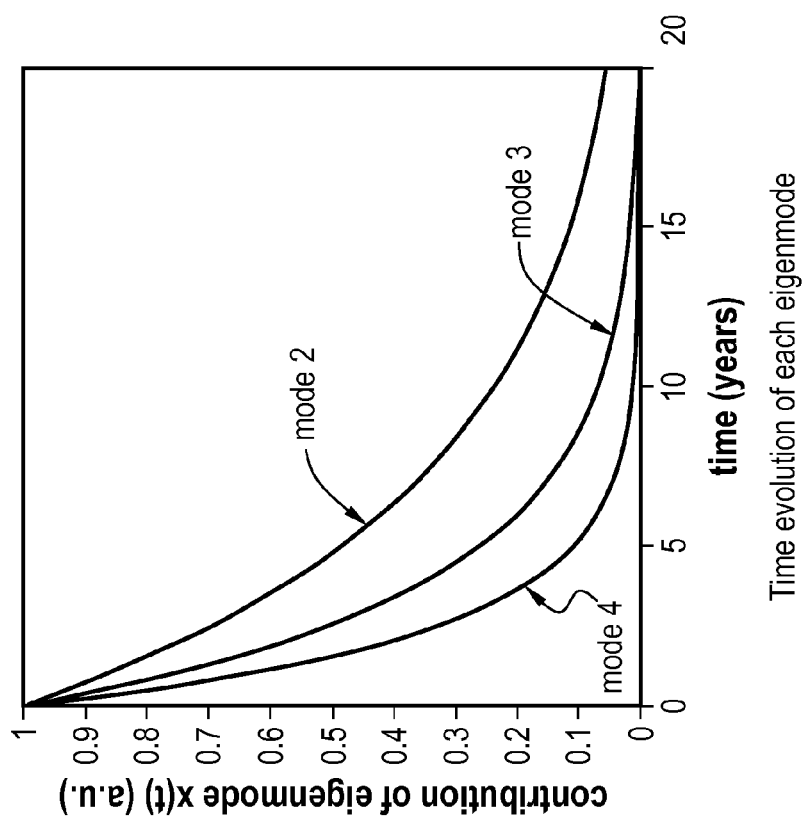
FIG. 15A depicts a plot of the time evolution of eigen-modes after an initial unit attack at t=0, for diffusion rate constant $\beta=1$ $yr^{-1}$ in accordance with an illustrative embodiment.

The time evolution of hypothesized atrophy is a linear combination of eigen-modes $$\Phi(t) = \int_0^t \sum_{i=1}^n (e^{-\beta\lambda_i t} u_i^\dagger x_0) u_i dt = \sum_{i=1}^n \frac{1}{\beta\lambda_i}(1-e^{-\beta\lambda_i t}) u_i^\dagger x_0 u_i \quad (6a)$$

consisting of a sum of two parts, a deterministic exponential part and a case-dependent random part determined by the initial configuration $x_0$ of the disease. FIG. 15B shows the deterministic part of the first 3 eigen-modes. Atrophy in all modes increases with time, but lasting and substantial effect is observed only in the persistent modes. The slower the decay rate, the more widespread and severe the damage.

Relationship to Prevalence Rates.

The rate of progression of the i-th eigen-mode is $\lambda_i$, and its eventual atrophy is $$\frac{1}{\beta\lambda_i} u_i^\dagger x_0 u_i.$$

We hypothesize that if eigen-modes are good models of dementias, then population wide prevalence rates should be reflected by the overall magnitude and rate of progression of the eigen-modes. Assuming new neurodegenerative attacks target all modes equally and ignoring genetic predisposition, then for the entire population, $1/\lambda_i$ translates into eventual prevalence rates of the corresponding dementia. Relative prevalence rates of various dementias as a function of time can similarly be predicted from the relative values of the decay curves (6) of each eigen-mode.

Incorporating Time-Varying Neurodegenerative Attacks.

Given a time-varying externally driven disease process a(t), the actual dynamics of the system will be given by its convolution with the diffusion kernel $$x(t) = \int_0^t e^{-\beta H(t-\tau)} a(\tau) d\tau = (e^{-\beta H t} x_0 * a)(t) = \Sigma_{i=1}^n (e^{-\beta\lambda_i t} * a)(t) u_i u_i^\dagger \quad (7a)$$

Eq. (7a) implies that although the disease dynamics depend on unknown and possibly random external attack process a(t), its behavior is still constrained within a small number of distinct eigen-modes. Thus, the pathophysiological nature, location and frequency of neurodegenerative attacks are irrelevant in this model.

Data Description for Building the Model

Healthy cohort: Axial T1 weighted FSPGR scans (TE=1.5 ms, TR=6.3 ms, TI=400 ms, 15° flip angle) with 230×230× 156 isotropic 1 mm voxels were acquired on a 3 Tesla GE Signa EXCITE scanner from 14 young healthy volunteers under an existing IRB-approved study, whose details were previously described. All participants signed written consent for this study in fulfillment of the Helsinki Declaration. High Angular Resolution Diffusion Imaging (HARDI) data (55 directions, b=1000 s/mm², 72 1.8-mm thick interleaved slices, 128×128 matrix size) were also acquired. 2) Age-matched normal, AD, and bvFTD cohorts: Eighteen subjects with AD, 18 subjects with bvFTD, and 19 age and gender-matched cognitive normal controls (CN) were scanned on a 4 Tesla MRI system, with a 3D volumetric MPRAGE sequence (TR/TE/TI=2300/3/950 ms, 7° flip angle, 1.0×1.0× 1.0 mm³ resolution, 157 continuous sagittal slices), at University of California at San Francisco (UCSF). AD was diagnosed according to published clinical criteria. Subjects with bvFTD were diagnosed with the behavioral variant subtype. Clinical diagnoses were not validated using histopathology or imaging, thus there is a significant possibility of pathological heterogeneity, especially in the bvFTD group, whose clinical presentation can frequently look similar to subjects with AD or semantic dementia. All subjects gave written informed consent before participating in the study, which was approved by the Committees of Human Research at UCSF. Study subject characteristics are summarized in Table 4.

TABLE 4

Study Subject Characteristics

| Gender | Healthy Young Control (Age) | Healthy Age-Matched Control | Alzheimer's | bvFTD |
|---|---|---|---|---|
| Female | 5 (23 ± 5.8) | 8 (61.5 ± 6.8) | 7 (62.1 ± 6.6) | 6 (61.8 ± 8.9) |
| Male | 9 (23.2 ± 4.3) | 11 (61.5 ± 12.5) | 11 (63.2 ± 7.7) | 12 (62.3 ± 11.8) |

Number of subjects (age range, mean ± SD

Validation of persistent modes To validate our hypothesis that persistent modes are homologous to known patterns of atrophy in several degenerative diseases, we compared the persistent modes with atrophy from our AD/bvFTD/normal aging cohort as follows: Persistent modes were computed using the average young healthy brain connectivity network. Normalized atrophy was given by the t-statistic between the diseased group and healthy group, i.e.

$$t_{AD}(i) = \frac{\mu_{h_{healthy}}(i) - \mu_{h_{AD}}(i)}{\sqrt{\frac{\sigma_{AD}(i)^2}{N_{AD}} + \frac{\sigma_{healthy}(i)^2}{N_{healthy}}}}$$

and formed the corresponding atrophy vector $t_{AD}=\{t_{AD}(i) | i \in [1, N]\}$, and similarly $t_{FTD}$ and $t_{aging}$. To these data we add a vector $t_{vol}$ of ROI volumes obtained from the mean of young healthy subjects, because we wish to determine whether the first eigen-mode corresponds to ROI volume. These statistical atrophy maps were visually compared with the persistent modes and plotted in a novel wire-and-ball brain map (FIG. 6,7) where the wires denote (healthy) network connections and the balls represent gray matter ROIs. Cortical atrophy and eigen-mode values were mapped onto the cortical surface of the 90-region cerebral atlas (FIG. 8). The same study was repeated using FreeSurfer volumetrics and a different 86-region FreeSurfer atlas. Healthy brain connectivity networks were re-computed using this new atlas for the purpose of seeding tracts. In order to perform statistically rigorous hypothesis testing, we adopted a simple correlation approach. The t-statistic of atrophy within each disease group and for all cortical ROIs was correlated with the absolute values of all hypothesized eigen-modes, and the $R^2$ and p-values of Pearson correlation coefficients were calculated. The statistical atrophy of each disease was plotted against each persistent mode.

Prediction of Population-Wide Prevalence of Diseases

The prevalence rates of various dementias were collected from literature survey. Unfortunately, prevalence estimates vary wildly between sources, age groups and ethnicity, especially at low prevalence rates in younger populations.

We grouped studies into decadal age ranges from 50 to 90+, and restricted ourselves to studies in advanced (OECD) nations. We computed, in each age range, prevalence rate as a percentage of each dementia over prevalence of ALL dementias. These data were taken from the following studies: (Harvey 2003), (Ratnavalli et al. 2002), (Kobayashi et al. 2009), (Jellinger et al. 2010), (Kukull et al. 2002), (Morrison 2010), (Di Carlo et al. 2002), (Plassman et al. 2007). To this published data we compared the theoretical prevalence that would be predicted by our model, as described in subsection A. Since the model has two parameters (age of onset and diffusivity constant β) whose true values cannot be uniquely determined form the literature, we estimated them by fitting the model to published data using a simple minimization routine.

Diagnostic Power of Persistent Modes

Finally we wish to determine whether the most persistent eigen-modes have utility for the purpose of diagnosing and classifying various dementias. Atrophy of each subject in the aged groups was normalized using the young healthy subjects, giving a z-score $z_k$ for the k-th subject. We computed the dot product between $z_k$ and the n-th eigen-mode, giving $d(k,n)=u_n^T z_k$. In order to remove the effect of different overall extent of atrophy in different dementias, this figure was normalized to $\bar{d}(k,n)$ such that $\Sigma_n \bar{d}(k,n)=1$. The latter values were fed into a 3-way (normal aging, AD, bvFTD) linear discriminate analysis (LDA) classifier. Receiver operator characteristic (ROC) curves were obtained after repeated leave-one-out analysis whereby each subject was classified based on training over all the other subjects. For comparison, we also implemented a conventional classifier based directly on atrophy z-scores $z_k$, after dimensionality reduction using principal components analysis (PCA).

The invention claimed is:

1. A method for analyzing a subject's brain, the method comprising:
    parcellating, by a computing device, grey matter in a medical image of the subject's brain to produce an initial disease state;
    applying, by the computing device, a diffusion kernel to the initial disease state to produce an output vector; and
    predicting future changes to the subject's brain based on the output vector.

2. The method of claim 1, wherein the medical image comprises a tomographic diffusion weighted image.

3. The method of claim 1, wherein the medical image is produced by MRI, CT, or PET.

4. The method of claim 1, wherein the diffusion kernel is generated based on the medical image of the subject's brain.

5. The method of claim 1, wherein the diffusion kernel is derived from a connectivity matrix that corresponds to the subject's brain.

6. The method of claim 1, further comprising:
    administering a medical intervention;
    parcellating, by a computing device, grey matter in a second medical image of the subject's brain to produce a second disease state;
    applying, by the computing device, a diffusion kernel to the second disease state to produce a second output vector;
    predicting future changes to the subject's brain based on the second output vector; and
    comparing predicted future changes to the subject's brain to predicted future changes to the subject's brain based on the second output vector.

7. The method of claim 1, further comprising:
    parcellating, by a computing device, grey matter in a second medical image of a second subject's brain to produce an initial disease state of the second subject;
    applying, by the computing device, a diffusion kernel to the initial disease state of the second subject to produce a second output vector;
    predicting future changes to the second subject's brain based on the second output vector; and
    stratifying the subject and the second subject based on a comparison of the output vector and the second output vector.

8. A non-transitory computer-readable medium having instructions stored thereon that, upon execution by a computing device, cause the computing device to perform operations comprising:
    parcellating grey matter in a medical image of a subject's brain to produce an initial disease state;
    applying a diffusion kernel to the medical image to produce an output vector; and
    predicting future changes to the subject's brain based on the output vector.

9. The non-transitory computer-readable medium of claim 8, wherein the operations further comprise reporting the future changes to the subject's brain by displaying representations of the future changes to the subject's brain.

10. A system for analyzing a subject's brain, comprising:
    a memory; and
    one or more processors coupled to the memory, wherein the one or more processors are configured to:
        parcellate grey matter in a medical image of the subject's brain to produce an initial disease state;
        apply a diffusion kernel to the medical image to produce an output vector; and
        predict future changes to the subject's brain based on the output vector.

11. The system of claim 10, wherein the one or more processors are further configured to report the future changes to the subject's brain by displaying representations of the future changes to the subject's brain.

* * * * *

UNITED STATES PATENT AND TRADEMARK OFFICE
CERTIFICATE OF CORRECTION

| | |
|---|---|
| PATENT NO. | : 9,563,950 B2 |
| APPLICATION NO. | : 14/777950 |
| DATED | : February 7, 2017 |
| INVENTOR(S) | : Ashish Raj |

It is certified that error appears in the above-identified patent and that said Letters Patent is hereby corrected as shown below:

In the Specification

In Column 1 Line 16, replace paragraph as shown:

This invention was made with government support under Grant Number NS075425 awarded by the National Institutes of Health. The Government has certain rights in the invention.

Signed and Sealed this
Twelfth Day of June, 2018

Andrei Iancu
*Director of the United States Patent and Trademark Office*